United States Patent [19]

Teraoka et al.

[11] Patent Number: 5,749,801
[45] Date of Patent: May 12, 1998

[54] DIFFERENTIAL UNIT

[75] Inventors: Masao Teraoka; Nobushi Yamazaki, both of Tochigi, Japan

[73] Assignee: Tochigi Fuji Sangyo Kabushiki Kaisha, Tochigi, Japan

[21] Appl. No.: 623,326

[22] Filed: Mar. 27, 1996

[30] Foreign Application Priority Data

| Mar. 28, 1995 | [JP] | Japan | 7-070083 |
| Jun. 30, 1995 | [JP] | Japan | 7-166047 |
| Nov. 17, 1995 | [JP] | Japan | 7-300012 |

[51] Int. Cl.$^6$ ............... F16H 1/455; B60K 17/20
[52] U.S. Cl. ............................................. 475/88
[58] Field of Search ................................. 475/88

[56] References Cited

U.S. PATENT DOCUMENTS

| 2,949,792 | 8/1960 | Smith | 475/88 |
| 3,229,550 | 1/1966 | Nickell | 475/88 |
| 3,232,139 | 2/1966 | Nickell | 475/88 |
| 5,310,388 | 5/1994 | Okcuoglu et al. | 475/88 |
| 5,595,214 | 1/1997 | Shaffer et al. | 475/88 |

Primary Examiner—Dirk Wright
Attorney, Agent, or Firm—Howard & Howard

[57] ABSTRACT

A differential unit is disclosed which has a differential limiting function and which exhibits stable differential limiting characteristic even if the difference in the differential rotations is small. The differential unit has a differential case, pinion gears, side gears, a gear pump disposed between a left side gear and the differential case. The hydraulic actuator, and a multiple disc clutch, wherein the gear pump consists of a plurality of gear pumps each having a pump case formed integrally with the differential case, a first accommodation hole of the pump case, a plurality of second accommodation holes formed at intervals in the circumferential direction of the first accommodation hole, a large-diameter gear rotatively accommodated in the first accommodation hole at a position on the outer surface of a boss portion of the left side gear and arranged to be rotated together with the left side gear, and small-diameter gears rotatively accommodated in the second accommodation holes and engaged to the large-diameter gear.

20 Claims, 16 Drawing Sheets

DIFFERENTIAL UNIT

BACKGROUND OF THE INVENTION

The present invention relates to a differential unit for use in a vehicle.

In U.S. Pat. No. 5,310,388, a differential unit 701 as shown in FIG. 1 has been disclosed. The differential unit 701 includes pinion gears 707 rotatively supported by a differential case 703 through a pinion shaft 705, a bevel-gear-type differential mechanism 713 consisting of right and left side gears 709 and 711 to be engaged to the pinion gears 707, a multiple disc clutch 715 serving as a differential limiting device, a hydraulic actuator 717 for clutching the multiple disc clutch 715, and an oil pump 719 for differential-operating the hydraulic actuator 717. Moreover, axle shafts 721 and 723 are spline-connected to the side gears 709 and 711.

The multiple disc clutch 715 and the oil pump 719 are disposed between the axle shaft 721 adjacent to the side gear 709 and the differential case 703. The oil pump 719 is operated with the differential torque transmitted from the differential mechanism 713 to supply hydraulic pressure to the hydraulic actuator 717 to clutch the multiple disc clutch 715. Since the discharge pressure from the oil pump 719 is raised as the differential rotation is large, the differential limiting torque (T) of the multiple disc clutch 715 is raised as the differential rotation difference (ΔN) is enlarged. Thus, the multiple disc clutch 715 has a speed-sensitive differential limiting function.

The conventional differential unit 701, as shown in FIG. 2, has the oil pump 719, which is an internal gear pump. The oil pump 719 having a pump case 731 rotatively accommodating pinion gears 727 secured to the axle shaft 721 by a spline 725 and an internal gear 729 to be engaged to the pinion gears 727. The oil pump 719, which receives the differential torque from the differential mechanism 713 so as to be operated, suffers from a small discharge. Thus there arises a problem in that the differential limiting characteristic is unstable when the oil pump 719 is operated with a small differential rotation difference (ΔN).

SUMMARY OF THE INVENTION

Accordingly, an object of the present invention is to provide a differential unit having a speed-sensitive (sensitive to difference in the differential-rotation) differential limiting function and capable of obtaining stable differential limiting characteristic even if the difference (ΔN) in the differential rotations is small.

In order to achieve the foregoing object, according to one aspect of the present invention, there is provided a differential unit comprising: a differential case to be rotated by drive force of an engine; a differential gear mechanism for outputting rotations of the differential case from a pair of side gears thereof through pinion gears supported in a portion adjacent to the differential case; a frictional clutch for limiting differential of the differential gear mechanism; an oil pump to be rotated due to differential rotations of the differential gear mechanism; an oil passage for causing an oil reservoir in a differential carrier (which rotatively supports the differential case) and the oil pump to communicate with each other and allow oil to flow to the oil pump; and a hydraulic actuator which receives oil discharge pressure from the oil pump so as to press and clutch a frictional clutch. The oil pump preferably consists of plural sets of gear pumps each having a pump drive gear provided for either of the differential case or the side gear, a pump housing formed integrally with the differential case or the side gear left from being provided with the pump drive gear, and a plurality of pump gears engaged to the pump drive gear and rotatively supported by the pump housing.

The differential unit according to the present invention has a structure such that the oil pump is a gear pump of a type having the engagement portion between the pump drive gear and the pump gear, the engagement portion serving as a pump. Thus, a speed-sensitive differential limiting mechanism is obtained where when differential rotations take place, the oil pump receives the differential torque to be operated; thus the gear pump discharges oil toward the hydraulic actuator to operate the hydraulic actuator so that the frictional clutch performs the clutching operation. The foregoing oil pump consists of plural sets of gear pumps in which the pump drive gear and the pump gear are engaged in a plurality of portions. Thus, the quantity of discharge from the pump can be increased. When this oil flows into the hydraulic acutator, the pressure of the hydraulic actuator goes up, so that the clutching force for the frictional clutch can be increased. Therefore, a stable differential limiting characteristic can be obtained even if the difference (ΔN) in the differential rotations is low.

The oil pump may consist of plural sets of external gear pumps each with a pump housing having a first accommodation hole formed integrally with the differential case in a direction of rotation while being formed coaxially with the differential case. A plurality of second accommodation holes are formed in a circumferential direction of the first accommodation hole at predetermined intervals. A large-diameter gear serves as a pump drive gear rotatively accommodated in the first accommodation hole, disposed on the outer surface of a boss portion of at least either of the side gears and arranged to be rotated together with the side gear. A plurality of small-diameter gears serve as pump gears rotatively accommodated in the second accommodation holes and arranged to be engaged to the large-diameter gear.

The differential unit according to the present invention has the differential limiting function with which the oil pump, which has received differential torque when differential rotations have taken place, operates the hydraulic actuator to cause the frictional clutch to perform the clutching operation. The oil pump is a gear pump disposed between at least either side gear and the differential case. Plural sets of gear pumps are provided which consists of a large-diameter gear (a pump drive gear) and a plurality of small-diameter gears (pump gears) engaged to the large-diameter gear. Thus, the quantity of the discharge from the pump can be increased. When this oil flows into the hydraulic actuator, the pressure of the hydraulic actuator goes up, so that the clutching force for the frictional clutch can be increased. Therefore, a stable differential limiting characteristic can be obtained even if the difference (ΔN) in the differential rotations is low.

The oil pump may consist of plural sets of internal gear pumps each having an internal-toothed gear serving as a pump drive gear disposed adjacent to the differential case and arranged to be rotated integrally with the differential case, a plurality of external-toothed gears provided adjacent to the side gear and engaged to the pump drive gear, and a pump housing rotatively supporting each pump gear and connected to the outer surface of a boss portion of the side gear while being permitted to be moved relatively in the axial direction.

The internal gear pump of the foregoing type is, different from an external gear pump, capable of enlarging the diameter of the internal-toothed gear (the pump drive gear) regardless of the external-toothed gear (the pump gear). Therefore, the rotational frequency of the external-toothed gear can be raised with respect to the rotational frequency of the internal-toothed gear. Thus, the gear pump can be operated at high speed so that large oil discharge and high pressure are obtained from the pump. Therefore, the dependency of the differential limiting function upon the pump pressure can be moderated, thus causing the influence of change in the differential rotational frequency to be eliminated. As a result, the differential limiting function can be stabilized.

Since the internal gear pump is enabled to enlarge the diameter of the internal-toothed gear as described above, the P.C.D (pitch circle diameter of a circle on which the oil ports are formed) of the oil ports can be enlarged. Thus, even if oil ports for plural sets of gear pumps are formed, the oil ports can be formed apart from one another. Therefore, the strength of the differential case can be maintained.

Since the P.C.D of the oil ports is large and, therefore, the oil level in the oil reservoir can be lowered, the quantity of oil required to be enclosed in the case can be reduced. Moreover, the resistance from rotations which is received by the differential unit and power loss can considerably be reduced. As a result, the fuel consumption of the engine can be reduced.

Moreover, the boss portion of the side gear is connected to the pump housing while being permitted to be relatively moved in the axial direction. The differential case is thus enabled to receive the thrust force of the side gear. As a result, deflection of the pump case due to the thrust forces of the side gears and scoring between the pump case and the gears can be prevented. Moreover, the necessity of thickening the pump case can be eliminated. As a result, the weight and size of the differential unit can be reduced.

A structure may be employed in which the oil pump and a hydraulic actuator are disposed in a space formed between back surfaces of the pair of side gears and the differential case, and the other side gear is outwardly shifted from the inner end surface of the boss portion in the axial direction.

As a result, the center of the right and left output shafts can be positioned in the central portion of a bearing span for supporting right and left end boss portions of the differential case. Therefore, the differential case adapted to the differential unit can be employed in a vehicle having a standard differential unit with no differential limiting function. Thus, the structure of the differential unit has compatibility in mounting with respect to a standard differential unit.

A frictional clutch may be disposed between the outer surface of the side gear and the differential case, on the side for which the hydraulic actuator is provided.

As a result, the frictional clutch and the hydraulic actuator can be reduced in size. Since the frictional clutches and the hydraulic actuators, which can be operated individually, are provided for the two side gears, further large differential limiting force can be obtained.

A structure may be employed in which the hydraulic actuator is disposed between one of the side gears and the differential case, a frictional clutch is disposed between the other of the side gears, opposite to the hydraulic actuator, and the differential case, and a pressing member is disposed between the hydraulic actuator and the frictional clutch, the pressing member being supported by the differential case movably in the axial direction and arranged to clutch the frictional clutch when the hydraulic actuator is operated.

As a result, the center of the right and left output shafts can easily be positioned in the central portion of the bearing span so that design can be performed more freely to realize mounting compatibility with respect to a usual differential unit.

An inner wall of the differential case may form a portion of the hydraulic actuator.

As a result, the hydraulic actuator can be disposed further outwardly in the radial direction in the differential case as compared with the conventional structure. Therefore, if the rotational frequency of the differential case is high, centrifugal force acts on the hydraulic oil to operate the hydraulic actuator. Thus, the straight moving stability of a vehicle in driving at high speed can be improved.

The differential unit may further comprise a plurality of oil ports in an oil reservoir, the plurality of oil ports being formed in a portion of the oil pump adjacent to the oil passage and arranged to alternately serve as oil suction openings and oil discharge openings to correspond to change in the direction of rotations of the oil pump. A plurality of oil ports are formed adjacent to the hydraulic actuator, the plurality of oil ports being formed in a portion of the oil pump adjacent to the hydraulic actuator and arranged to alternately serve as oil suction openings and oil discharge openings to correspond to change in the direction of rotations of the oil pump. Also, and a bent-type valve member is disposed adjacent to either or both of the oil reservoir and the hydraulic actuator, and having a pair of valve portions disposed to face the oil ports. The bent-type valve member is able to swing relative to a swing support point disposed between the pair of valve portions, wherein the valve member swings due to a force couple generating when the two valve portions of the valve member receive hydraulic pressure of the oil pump to open the oil port and allow oil to flow from the oil reservoir toward the hydraulic actuator and to close the oil port for allowing oil to flow from the hydraulic actuator toward the oil reservoir.

That is, the oil ports formed in the oil reservoir of the oil pump and the oil ports formed adjacent to the hydraulic actuator are alternately changed to the suction openings and discharge openings when the direction of differential rotation has been changed and the oil pump has been rotated in a reverse direction. Therefore, the bent-type valve member is provided for either or both of the oil reservoir and a portion adjacent to the hydraulic actuator.

Each valve member has a pair of valve portions disposed to face the oil ports and the swing support point disposed between the valve portions. Each valve portion receives the hydraulic pressure from the oil pump so that a force couple is generated with which the valve members swing.

When the valve member swings, either of the valve portions and the oil port overlap. Overlapping of another valve portion with the oil port is then ends. As a result, the valve member opens the oil ports (the suction port in the oil reservoir and the discharge port in the hydraulic actuator) for causing oil to flow from the oil reservoir to the hydraulic actuator. Moreover, the valve member closes the oil ports (the discharge port in the oil reservoir and the suction port in the hydraulic actuator) for causing oil to flow from the hydraulic actuator to the oil reservoir.

The flow of the oil can be rectified into one direction due to the checking function of each valve member regardless of the rotational direction of the oil pump (regardless of the direction of the differential rotations). Therefore, oil can be supplied from the oil reservoir to the hydraulic actuator regardless of the rotational direction of the oil pump. Therefore, the foregoing speed-sensitive differential limiting function can always be obtained.

Although the conventional structure must have the check valve for each oil port of the oil pump, one valve member is able to open or close two oil ports because the valve member swings in the present invention. Therefore, the number of the valve members can be halved, the structure can be simplified, and the number of required parts, the number of mounting processes and the cost can significantly be reduced.

Since the swinging force (a force couple) generated when hydraulic pressure in the opposite direction is applied to the valve portion to be opened acts on the valve portion to be closed, the oil port can completely be closed even if the differential rotational frequency is low and, therefore, the discharge pressure from the oil pump is low. Therefore, a complete checking function can be obtained, and pressure leakage and loss of the pumping work can be prevented. As a result, sufficiently large differential limiting force can be obtained even if the differential rotational frequency is low.

The position of the valve member may be maintained due to the oil pressure.

As a result, a member for maintaining the position of the valve member can be omitted. Thus, the structure can be simplified, the number of required parts, the number of the mounting processes and the cost can be reduced.

The swing support point may have, on the reverse side thereof, a retaining member for retaining the valve member onto a fixed member.

Since the retaining member is disposed as described above, the valve member can reliably be supported so that the force couple generated in the valve member is used to close the oil port. Therefore, the checking function can further be improved.

The valve member may be a temperature-sensitive reversibly-deformable member which is deformed corresponding to the temperature of oil and which opens the oil port in a low oil temperature state where the temperature of oil is low to a larger extent as compared with a high oil temperature state where the temperature of oil is high.

As a result, when the temperature of oil is low, the viscosity of oil is high and thus the quantity of leakage of oil from the gear pump is reduced. However, since the degree of opening of each of the oil ports is large, excessive enlargement of the differential limiting force due to an enlargement of the driving resistance of the oil pump due to the reduction in the quantity of the oil leakage can be prevented. Thus, a required differential limiting operation depending upon the clutching force of the frictional clutch can be performed. When the temperature of oil is high, the quantity of oil leakage is enlarged and, therefore, the oil discharge pressure is lowered, thus resulting in the clutching force of the frictional clutch being reduced excessively. However, the oil ports are not opened excessively, the driving resistance of the oil pump can be intensified. Thus, the insufficient clutching force of the frictional clutch can be compensated by the driving resistance of the oil pump. As a result, a required differential limiting operation can be performed. Accordingly, a stable differential limiting operation can be performed without the influence of change in the temperature of oil.

Other objects, features and advantages of the invention will be evident from the following detailed description of the preferred embodiments described in conjunction with the attached drawings.

DESCRIPTION OF THE PREFERRED EMBODIMENTS

A first embodiment of the present invention will now be described with reference to the drawings.

Figure 1:
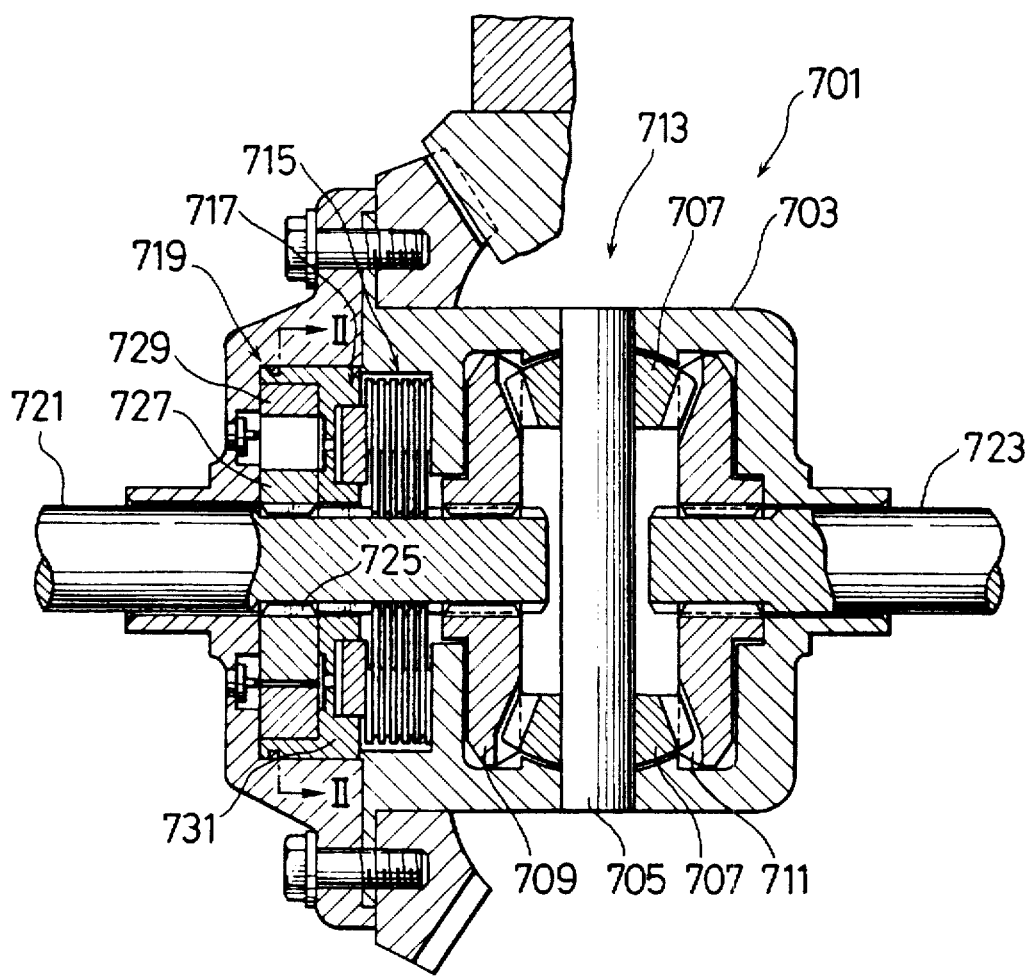
FIG. 1 is a cross sectional view showing a conventional differential unit.
Figure 2:
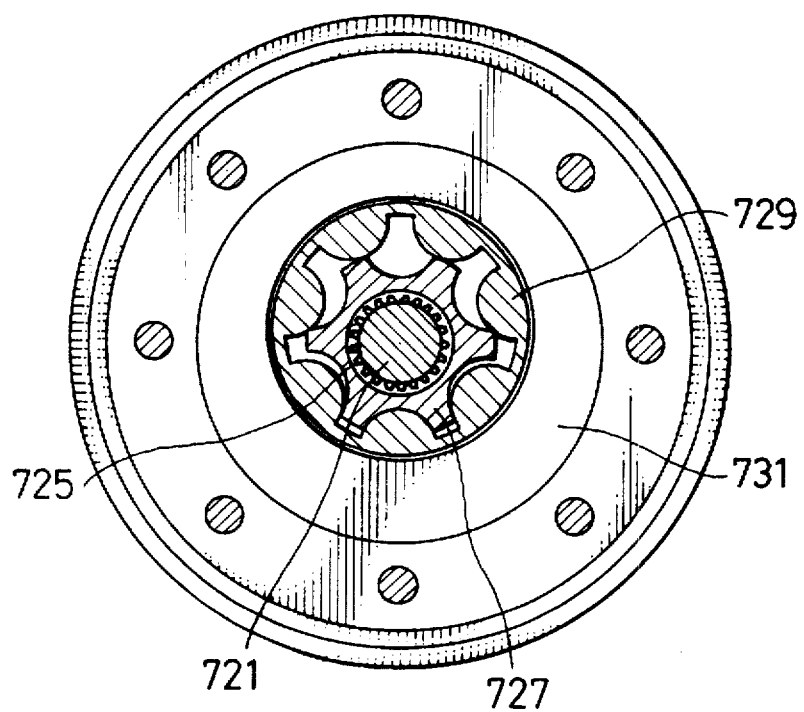
FIG. 2 is a cross sectional view taken along line II—II shown in FIG. 1.
Figure 3:
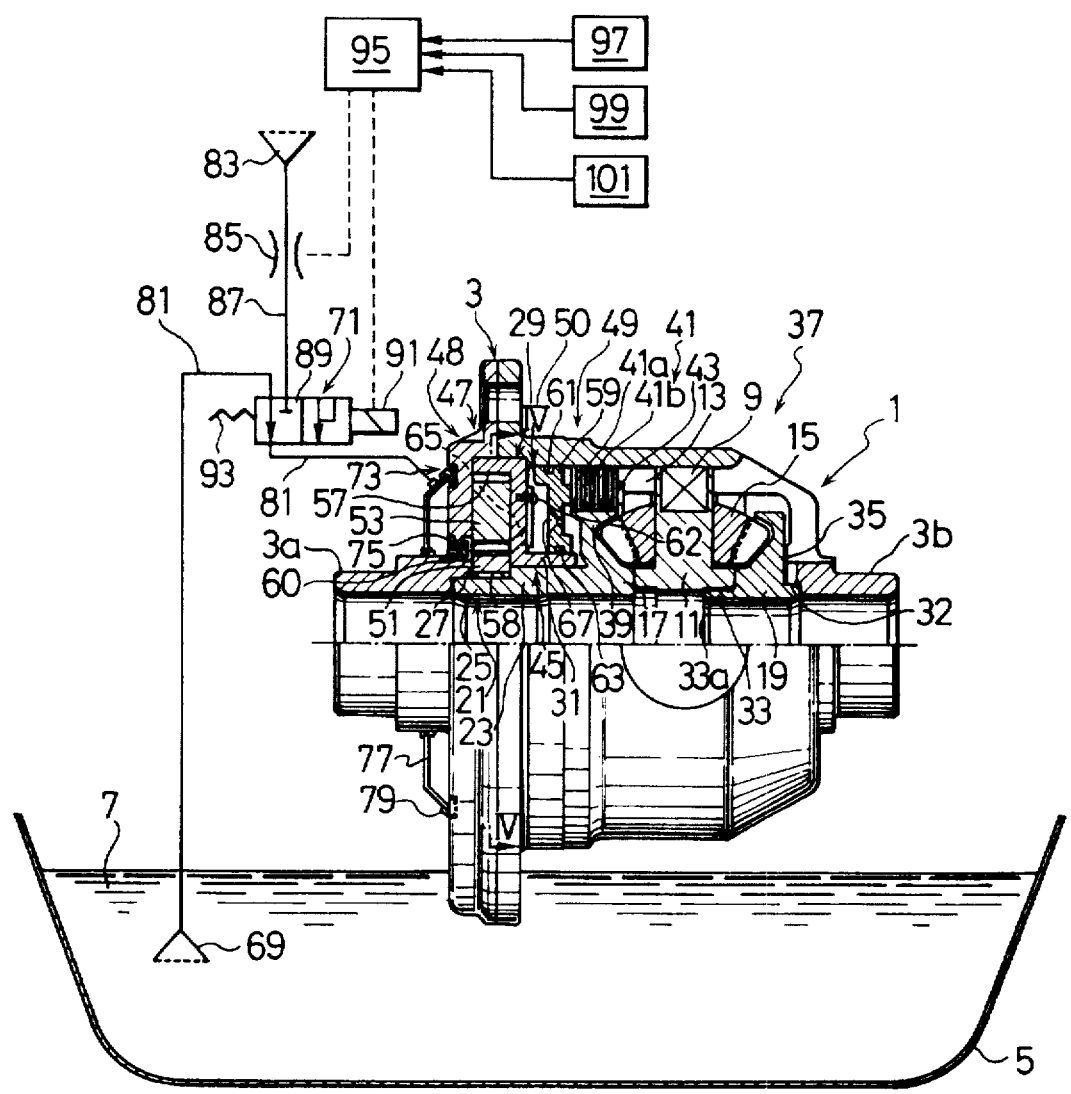
FIG. 3 is a cross sectional view showing a differential unit according to a first embodiment of the present invention.
Figure 4:
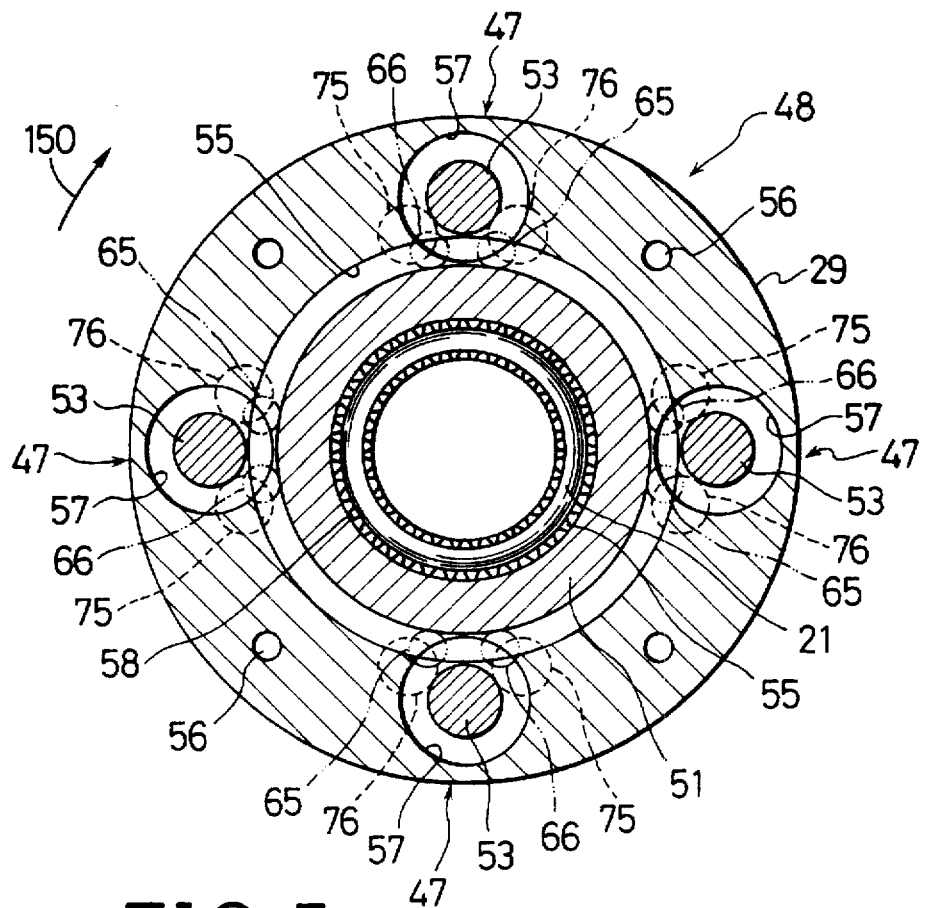
FIG. 4 is a cross sectional view taken along line IV—IV shown in FIG. 3.

FIG. 3 is a cross sectional view showing a differential unit according to the first embodiment of the present invention. FIG. 4 is a cross sectional view taken along line IV—IV of FIG. 3. The horizontal direction in FIG. 3 is the same as that in FIG. 1. Elements having no reference numeral are omitted from illustration.

As shown in FIG. 3, the differential unit 1 is, by boss portions 3a and 3b disposed at horizontal ends of a differential case 3, rotatively supported by a differential carrier 5 through a bearing.

The differential carrier 5 for rotatively supporting the differential unit 1 has an oil reservoir 7.

The differential case 3 includes pinion shafts 9 disposed radially relative to a boss portion 11. Each pinion shaft 9 is, at the end thereof, received in a groove 13 of the differential case 3 while being permitted to be moved in the axial direction. Pinion gears 15 are rotatively supported on each of the pinion shafts 9.

The differential case 3 includes right and left side gears 17 and 19. The left side gear 17 (one of the side gears 17 and 19) is formed on the outer surface of the inner end of a boss portion 21 connected to a left output shaft. The boss portion 21 is formed into two-step shape consisting of a large-diameter boss portion 23 and a small-diameter boss portion 25 formed toward the left in the axial direction. The left side gear 17 is, at the small-diameter boss portion 25 thereof, rotatively supported by a supporting portion 27 of the differential case 3 and, at the large-diameter boss portion 23 thereof, rotatively supported on the inner surface of a boss portion 31 of a pump case 29 to be described later. The right side gear (the other side gear) 19 is formed while being shifted from the inner end surface of a boss portion 33 to be connected to the right output shaft toward the right in the axial direction (outwardly in the axial direction). The right side gear 19 is, at a boss portion 32, rotatively supported by the differential case 3 and, at a boss portion 33, rotatively supported on the inner surface of the boss portion 11 of the pinion shaft 9. A washer 35 is disposed between the right side gear 19 and the differential case 3.

Thus, a bevel-gear-type differential mechanism 37 is formed. The pinion shaft 9, the pinion gears 15 and the side gears 17 and 19 of the differential mechanism 37 can be moved in the axial direction for an appropriate distance.

The force for rotating the differential case 3 is distributed from the pinion shaft 9 to the right and left side gears 17 and 19 through the pinion gears 15 so as to be transmitted to the right and left output shafts. When a difference in the drive resistance arises between the right and left output shafts, the rotation of the pinion gears 15 result in the drive force from the engine being differential-distributed to the right and left portions. The outer surface of each of the side gears 17 and 19 is extended to a position near the back surface (an outer surface of the differential case 3 in the radial direction) of the pinion gears 9.

Between an outer portion 39 of the left side gear 17 and the differential case 3, there is disposed a multiple disc clutch (a fictional clutch) 41 so that slide friction takes place at the outermost portion on the outside of the multiple disc clutch 41 in the radial direction from the differential mechanism 37 in the differential case 3. The multiple disc clutch 41 consists of a plurality of outer clutch plates 41a spline-connected to the inner surface of the differential case 3 and permitted to be moved in the axial direction; and a plurality of inner clutch plates 41b spline-connected to the outer portion 39 of the left side gear 17 and permitted to be moved in the axial direction, the outer clutch plates 41a and the inner clutch plates 41b being disposed alternately. Between the right end of the multiple disc clutch 41 and the differential case 3, there is disposed a back ring 43.

Between the back surface of the left side gear 17 and the differential case 3, there is disposed a space 45. In the space 45, an oil pump 48 consisting of a plurality of circumscribed-type gear pumps 47 and a hydraulic actuator 49 are disposed between the left side gear 17 and the differential case 3.

The oil pump 48 is, as shown in FIG. 4, formed by plural (four sets in the embodiment shown in FIG. 4) sets of gear pumps 47 each of which consists of a large-diameter gear (a pump drive gear) 51 disposed in the pump case (a pump housing) 29 and a plurality of small-diameter gears (pump gears) 53 to be respectively engaged to the large-diameter gear 51.

The pump case 29 is arranged so as to integrally rotate together with the the differential case 3. The outer surface of the pump case 29 is press-fit to the inner surface of the differential case 3, the pump case 29 is secured to the differential case 3 with bolts 56 so as to support the large-diameter boss portion 23 of the left side gear 17 on the inner surface of the boss portion 31 of the pump case 29.

Figure 5:
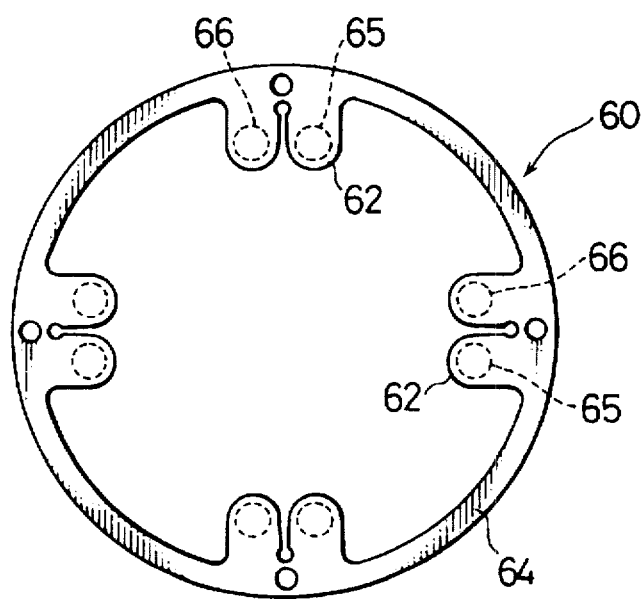
FIG. 5 is a plan view showing a valve plate.

The pump case 29 has a first accommodation hole 55 formed coaxially with the differential case 3 and four second accommodation holes 57 formed at equal intervals in the circumferential direction of the first accommodation hole 55. The second accommodation holes 57 are allowed to communicate with the first accommodation hole 55 in the radial direction. The first accommodation hole 55 rotatively accommodates the large-diameter gear 51 secured, by a spline 58, to the outer surface of the small-diameter boss portion 25 of the left side gear 17. The second accommodation holes 57 respectively rotatively accommodate small-diameter gears 53. The small-diameter gears 53 are engaged to the large-diameter gear 51 in the communication portion with the first accommodation hole 55 so that the gear pumps 47 are formed at each engagement portion between the two gears 51 and 53. Since the four small-diameter gears 53 are engaged to the large-diameter gear 51 in this embodiment, four gear pumps 47 are formed. A valve plate 60 is attached to the pump case 29 by bolts 62, as shown in FIG. 5. Four projections 62 formed at the equal intervals in the circumferential direction of the valve plate 60 are in contact with respective discharge openings 65 of the pump case 29. When differential rotations between the side gear 17 and the differential case 3 have been raised to a predetermined rotation or higher, and thus a discharge pressure has been generated, the projections 62 act as lead valves to apply hydraulic pressure to the hydraulic actuator 49. The valve plate 60 integrally connects the projections 62 by arms 64 to decrease the number of parts so as to improve the positioning characteristic.

The hydraulic actuator 49 is disposed between the multiple disc clutch (the frictional clutch) 41 and the gear pumps 47. A piston 59 of the hydraulic actuator 49 is moveable in the axial direction and sealed through seals 61 and 63 between the outer surface of the boss portion 31 of the pump case 29 of the gear pumps 47 and the differential case 3. An inner wall 50 of the differential case 3 forms a portion of the hydraulic actuator 49.

When the differential rotations take place with the differential mechanism 37, the pump case 29 rotates in a direction indicated by an arrow 150 prior to the large-diameter gear 51, the small-diameter gear 53 of the gear pumps 47 rotates in the second accommodation holes 57 so that hydraulic oil is sucked into the accommodation holes 55 and 57 through a suction opening 75 and the hydraulic oil is discharged through a discharge openings 65 of the pump case 29. Thus, hydraulic pressure is applied to the hydraulic actuator 49. The hydraulic actuator 49 presses the multiple disc clutch 41 through the piston 59 so that the multiple disc clutch 41 is clutched. When the multiple disc clutch 41 is clutched in addition to the resistance generated when the gear pumps.47 sucks the hydraulic oil and discharges the same, the relative rotation between the side gear 17 and the differential case 3 are limited so that the differential rotations of the differential mechanism 37 are limited. The piston 59 has orifices 67 to release the pressure of the oil or air.

When the large-diameter gear 51 rotates in the direction indicated by the arrow 150 prior to the pump case 29, hydraulic oil is sucked into the accommodation holes 55 and 57 through a suction opening 76 and the hydraulic oil is discharged through the discharge opening 66 of the pump case 29 so that hydraulic pressure is applied to the hydraulic actuator 49. Thus, the difference rotations of the differential mechanism 37 are limited similar to the foregoing case.

An oil pipe (an oil passage)81 connects the gear pump 47 and the oil reservoir 7 provided by the differential carrier 5. The gear pump 47 sucks oil from the oil reservoir 7 through an oil filter 69, a control valve 71, an oil connector 73 and the suction opening 75.

The oil connector 73 consists of a hollow member 77 secured to the differential carrier 5 in the rotational direction and a slide ring 79 comprising an elastic member having a wire ring and attached to the hollow member 77. The slide ring 79 has, in the inner surface thereof, a groove, with which an oil opening formed in the hollow member 77 is allowed to always communicate. A slide ring 79 is secured to the differential case 3 to slide to and from the hollow member 77 when the differential case 3 is rotated so that discharge of hydraulic oil introduced through the oil opening is prevented.

In addition to an oil pipe 81, an air pipe 87 for introducing air through an air filter 83 and a flow control valve 85 is connected to the suction port of the control valve 71. A spool 89 of the control valve 71 is moved by a solenoid 91 and a spring 93 so as to be shifted between a position shown in FIG. 3, at which it interrupts air to cause oil to flow, and a position, at which it causes both air and oil to flow so as to mix air with oil.

The position of the control valve 71 is switched by a controller 95 through a solenoid 91. The controller 95 adjusts the angular degree of opening of the flow control valve 85 to adjust the quantity of air mixed with respect to oil.

The controller 95 receives a car-speed signal transmitted from a car-speed sensor 97, a brake on-off signal transmitted from a brake sensor 99 and a steering-angle signal transmitted from a steering-angle sensor 101. In response to the foregoing signals, the controller 95 switches the control valve 71 to the position at which air is interrupted and oil is allowed to flow when the car speed is, for example, 40 km/h or lower. If the car speed is higher than 40 km/h or the brake pedal is operated or the steering angle is larger than a predetermined value, the controller 95 switches the control valve 71 to the position at which both air and oil are allowed to flow. Thus, an interference with an ABS unit can be prevented.

When air is interrupted, only oil is supplied to the gear pumps 47. When the rotation difference (ΔN) is enlarged, the differential limiting torque (T) is raised rapidly. When air is mixed with oil, the discharge pressure of the gear pumps 47 is lowered so that the clutching force of the multiple disc clutch 41 is reduced. Thus, the rise in the differential limiting torque (T) can be limited. When a flow control valve 85 is gradually closed while air is being mixed, the differential limiting torque (T) is raised so that various differential limiting characteristics are realized.

The differential unit 1 is formed as described above.

The differential unit 1 mounted on a vehicle acts as follows: if either of the right and left output shafts rotates idly due to rough road or the like, the gear pump 47 is operated so that hydraulic pressure is applied to the hydraulic actuator 49. Thus, the multiple disc clutch 41 is pressed and clutched through the piston 59. As a result, a large differential limiting force can be generated so that the drive force of the engine is supplied to another output shaft through the differential unit 1. Thus, rough-road driving capability can be improved. When the vehicle turns moderately with a small differential rotational frequency, the differential limiting force is reduced so that the vehicle is enabled to be smoothly and stably turned.

When the structure is arranged such that the quantity of air to be mixed can be controlled by the flow control valve 85 to be adaptable to various driving conditions, an optimum differential limiting characteristic can be realized for each of different driving conditions. As a result, the drivability of the vehicle can significantly be improved. If the number of the clutch plates of the multiple disc clutch 41 is changed, the differential limiting force can be adjusted.

Since the oil pump 48 consists of four sets of the gear pumps 47 formed by the large-diameter gear 51 and four small-diameter gear 53 disposed around the large-diameter gear 51, the quantity of discharge from the oil pump 48 is increased. Thus, a stable differential limiting characteristic can be obtained even if the difference (ΔN) in the differential rotations is low. Because when the enlarged oil flow into the hydraulic actuator 49, the pressure of the hydraulic actuator 49 goes up, so that the clutching force for the frictional clutch 41 can be increased.

Moreover, the left side gear 17 is integrally formed on the outer surface at the inner end of the boss portion 21 which is connected to either of the output shafts. Since the multiple disc clutch 41 is disposed between the outer portion 39 of the left side gear 17 and the differential case 3 and the right side gear 19 is formed while being outwardly shifted from the inner end surface 33a of the boss portion 33 in the axial direction, the center of the right and left output shafts can be positioned in the central portion of a bearing span for supporting right and left end boss portions 3a and 3b of the differential case 3.

Therefore, the differential case 3 adapted to the differential unit 1 can be employed in a vehicle having a standard differential unit with no differential limiting function. That is, the structure of the differential unit 1 has compatibility in mounting with respect to a standard differential unit. As a result, since only one differential carrier is required to be manufactured, the costs of the differential unit and the differential carrier can be reduced.

Since the inner wall 50 of the differential case 3 forms a portion of the hydraulic actuator 49, the hydraulic actuator 49 can be positioned on the outside in the radial direction. Thus, driving stability can be improved when the vehicle runs at high speed with high rotational frequency of the differential case 3, particularly when the vehicle moves straight. The foregoing effect can be obtained regardless of the differential rotations between the differential case 3 and the left side gear 17 and without dependency upon the adjustment of the control valve 71 performed by the controller 95. Since the multiple disc clutches 41 can be, near the inner wall 50 of the differential case 3, disposed on the circumference of the same axis of the hydraulic actuator 49, large differential limiting force can be obtained.

A second embodiment of the present invention will now be described.

Figure 6:
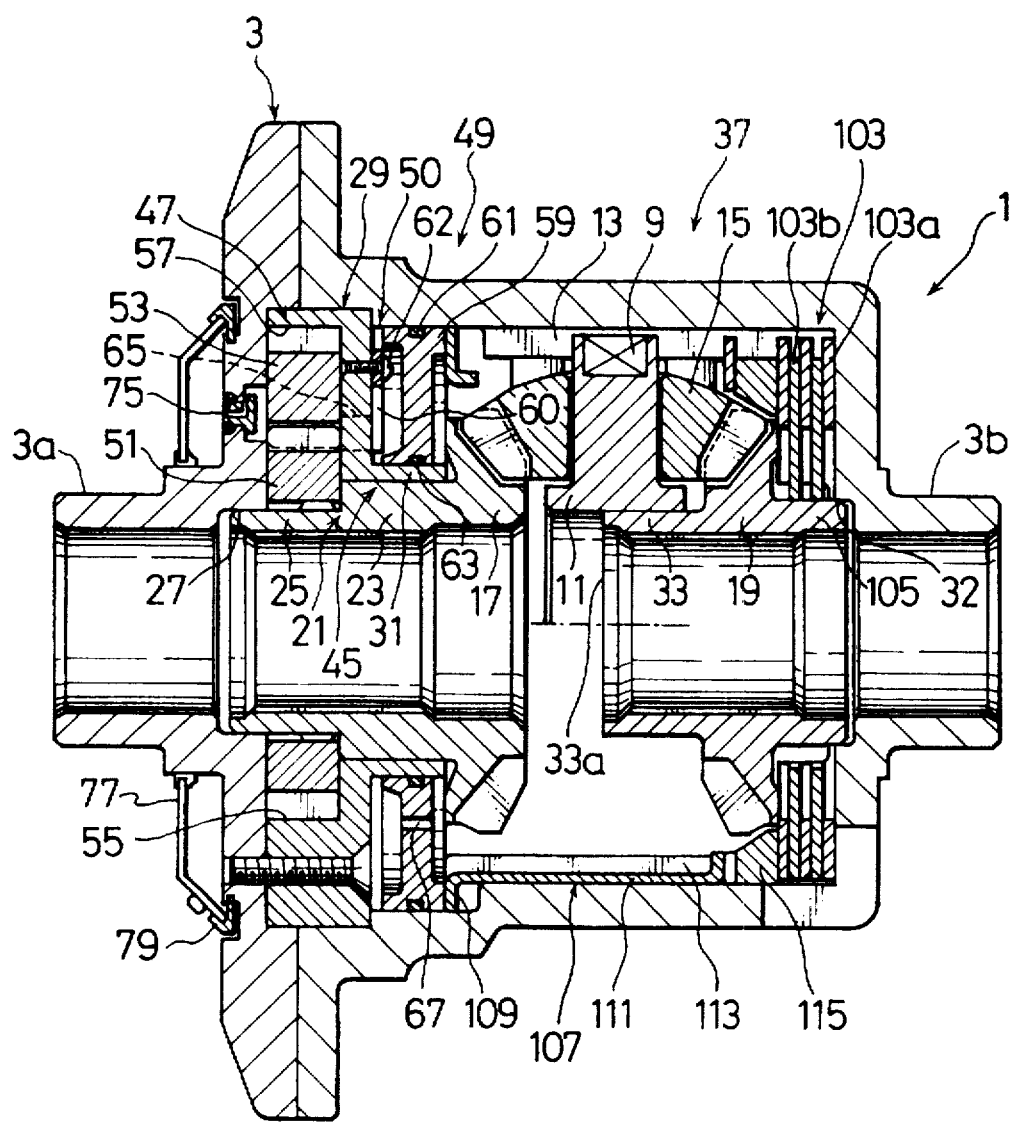
FIG. 6 is a cross sectional view showing a differential unit according to a second embodiment of the present invention.

FIG. 6 is a cross sectional view showing a differential unit according to a second embodiment of the present invention. The differential unit according to this embodiment has a structure similar to that of the differential unit according to the first embodiment except the location of the multiple disc clutch 103. Therefore, elements having the same functions are given the same reference numerals and they are omitted from description. The description will be performed hereinafter about different portions.

In this embodiment, the multiple disc clutch (the frictional clutch) 103 is disposed between the right side gear 19 and the differential case 3.

The multiple disc clutch 103 is formed by alternately disposing a plurality of outer clutch plates 103a movably spline-connected to the inner surface of the differential case 3 in the axial direction and a plurality of inner clutch plates 103b movably spline-connected to the outer surface of a boss portion 105 positioned on the right (on the outside in the axial direction) of the right side gear 19 in the axial direction.

Between the multiple disc clutch 103 and the piston 59 of the hydraulic actuator 49, there is disposed a pressing member 107 for clutching the multiple disc clutch 103 due to the operation of the hydraulic actuator 49.

Figure 7:
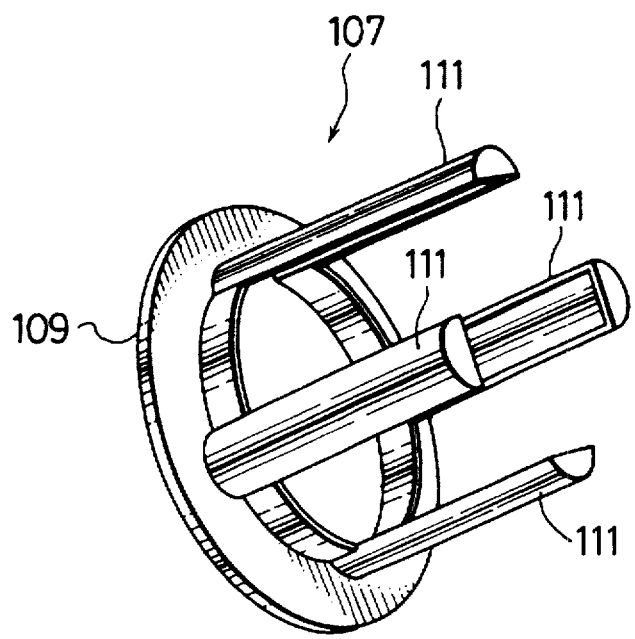
FIG. 7 is a perspective view showing a pressing member.

The pressing member 107 is, as shown in FIG. 7, formed by a ring plate 109 and a plurality of (four in this embodiment) arms 111 projecting over the ring plate 109 in the axial direction. The arms 111 are disposed in the circumferential direction of the ring plate 109 at predetermined intervals.

The pressing member 107 has the arms 111 movably received in the groove 113 of the differential case 3. Between the pressing member 107 and the multiple disc clutch 103, there is disposed a back plate 115.

Similarly to the first embodiment, this embodiment has structure such that the center of the right and left output shafts are positioned in the central portions of the bearing span for supporting the right and left boss portions 3a and 3b of the differential case 3. Therefore, the differential case 3 adapted to the differential unit 1 has compatibility with a standard differential unit.

Since the multiple disc clutch 103 is, in this embodiment, disposed between the side gear 19 and the differential case 3, the multiple disc clutch 103 being placed at a position opposite to the hydraulic actuator 49, the center of the right and left output shafts can be positioned in the central portion of the bearing span of the differential case 3. Thus, freedom is given in the design for the purpose of obtaining compatibility in mounting with respect to a standard differential unit.

Since a portion of the hydraulic actuator 49 is formed by the inner wall 50 of the differential case 3, the hydraulic actuator 49 can be disposed on the outside in the radial direction. Thus, driving stability can be improved when the vehicle runs at high speed with high rotational frequency of the differential case 3, particularly when the vehicle moves straight. The foregoing effect can be obtained regardless of the differential rotations between the differential case 3 and the left side gear 17 without dependency upon the adjustment of the control valve 71 performed by the controller 95. Since the multiple disc clutches 41 can be, near the inner wall 50 of the differential case 3, disposed on the circumference of the same axis of the hydraulic actuator 49, large differential limiting force can be obtained.

A third embodiment of the present invention will now be described with reference to the drawings.

Figure 8:
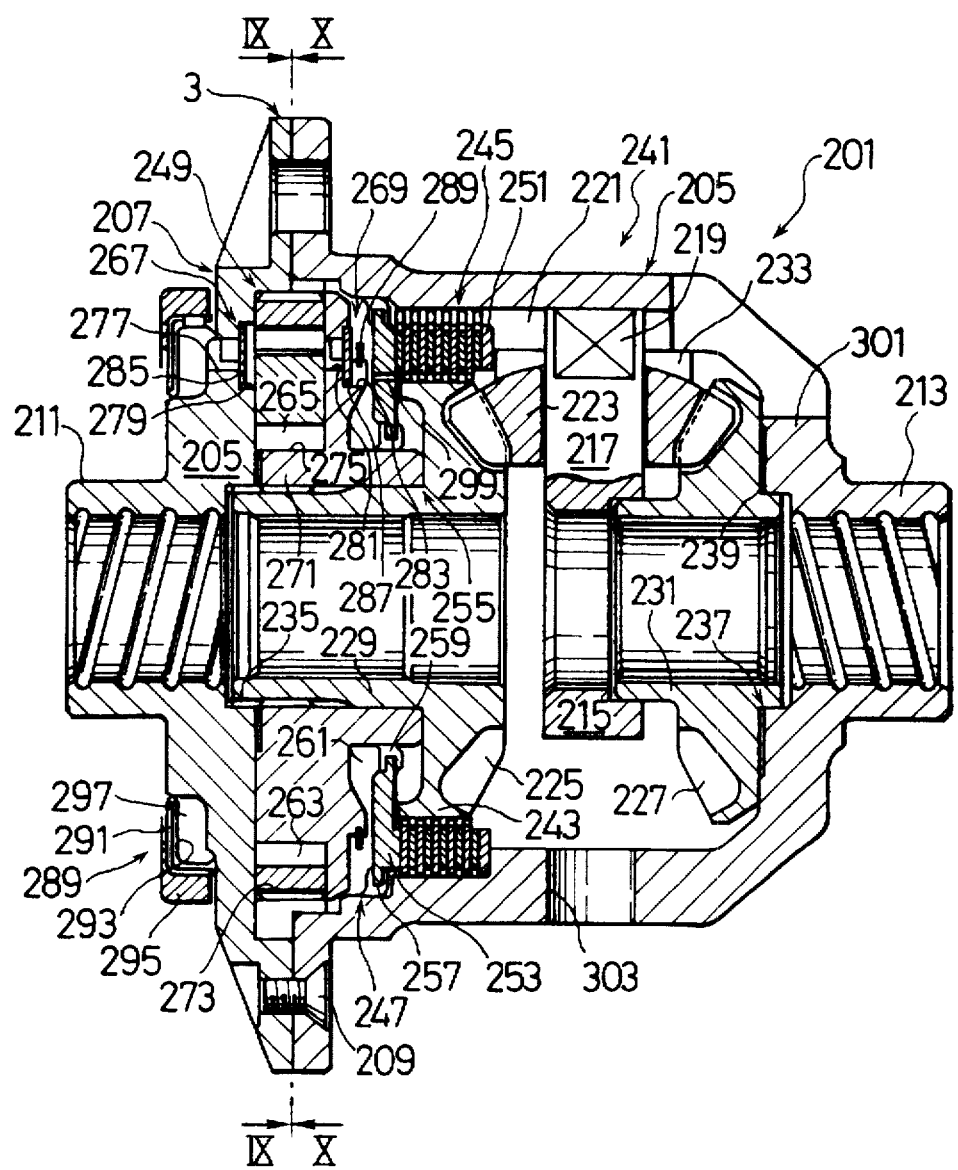
FIG. 8 is a cross sectional view showing a differential unit according to a third embodiment of the present invention.
Figure 9:
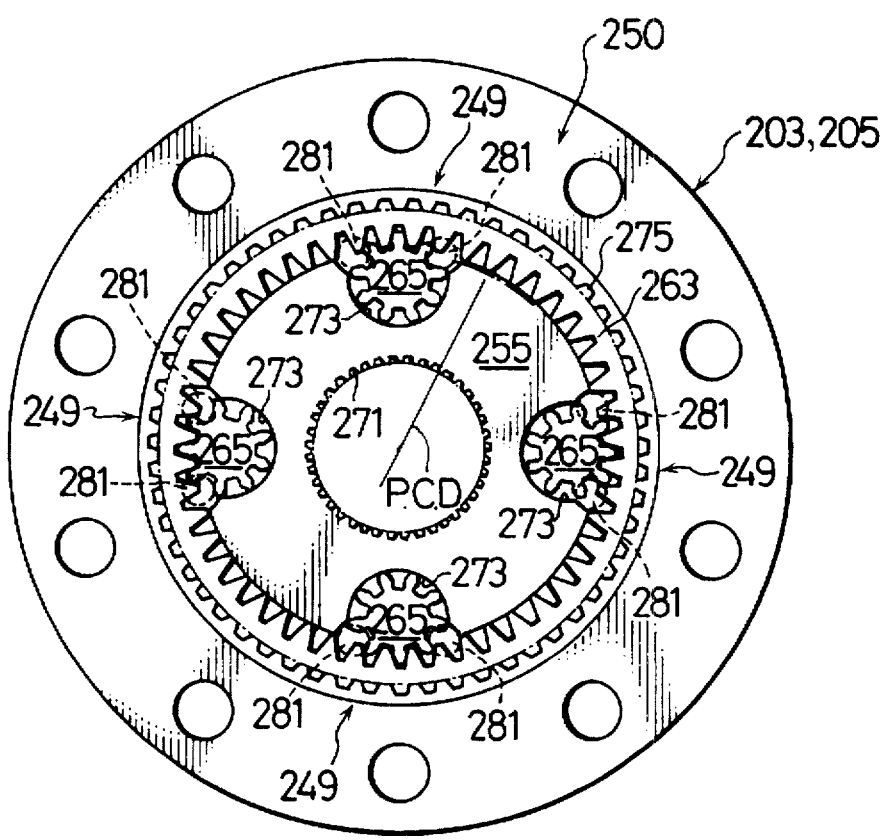
FIG. 9 is a cross sectional view taken along line IX—IX shown in FIG. 8.
Figure 10:
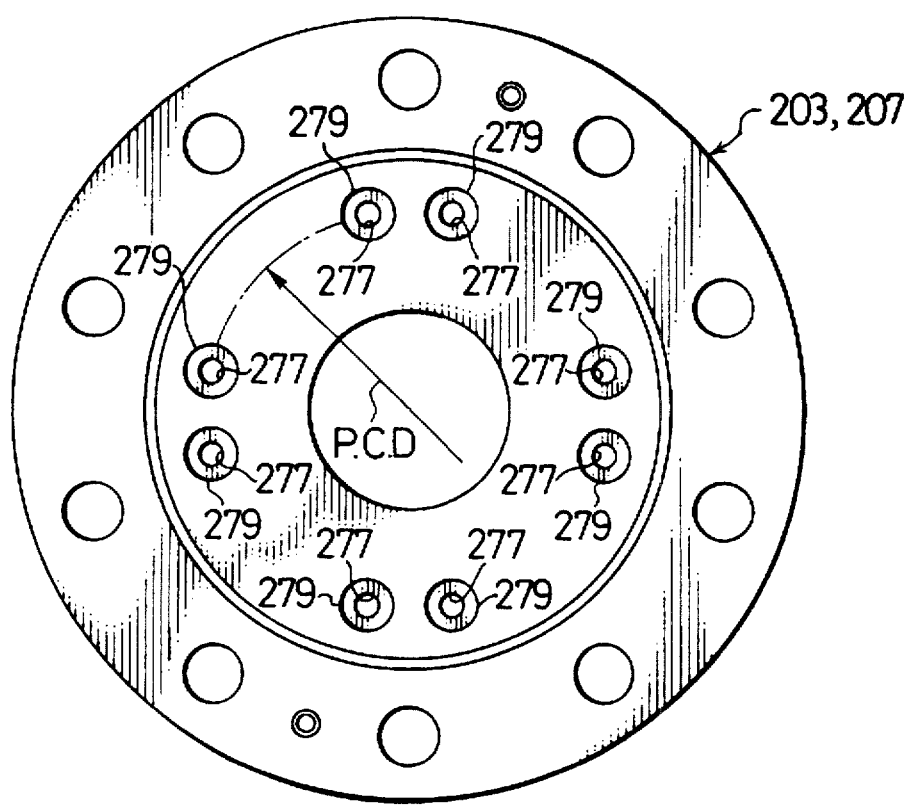
FIG. 10 is a cross sectional view taken along line X—X shown in FIG. 8.

FIG. 8 is a cross sectional view showing a differential unit according to a third embodiment of the present invention. FIG. 9 is a cross sectional view taken along line IX—IX shown in FIG. 8. FIG. 10 is a cross sectional view taken along line X—X shown in FIG. 8.

As shown in FIG. 8, a differential case 203 of a differential unit 201 is formed by fixing a casing 205 and a cover 207 with bolts 209. The differential case 203 is disposed in a differential carrier. The differential carrier has an oil reservoir formed therein.

Right and left boss portions 211 and 213 of the differential case 203 are supported by the differential carrier through bearings. A ring gear is, secured to the differential case 203 by bolts, the ring gear being engaged to a drive gear of a drive-force transmission system. Thus, the differential case 203 is, by the drive force of the engine, rotated through the drive-force transmission system.

The differential case 203 includes a plurality of pinion shafts 217 disposed radially relative to a boss portion 215.

A chamfered portion 219 formed in an outer end of each of the pinion shafts 217 is, in a direction of rotations, engaged to a groove 221 of the differential case 203. Pinion gears 223 are rotatively supported on each of the pinion shafts 217.

The differential case 203 includes right and left output side gears 225 and 227. The side gears 225 and 227 are integrally formed with corresponding boss portions 229 and 231. Each of the side gears 225 and 227 is supported from outside in the radial direction due to engagement with the pinion gears 223. Between the pinion gears 223 and the differential case 203, there is disposed a spherical washer 233. The centrifugal force of the pinion gears 223 and the engagement with each of the side gears 225 and 227 burden the reaction from the engagement to be borne by the pinion gears 223.

The boss portion 229 of the left side gear 225 is rotatively supported by a support portion 235 of the differential case 203. The boss portion 231 of the right side gear 227 is rotatively supported by a support portion 237 of the differential case 203. Between the right side gear 227 and the differential case 203, there is disposed a washer 239. The side gears 225 and 227 are spline-connected to the right and left axle shafts through the boss portions 229 and 231.

Thus, a differential gear mechanism 241 of a bevel gear type is formed. The pinion shafts 217, the pinion gears 223 and the side gears 225 and 227 of the differential gear mechanism 241 are able to move along the groove 221 in the axial direction.

The drive force for rotating the differential case 203 is distributed from the pinion shafts 217 to the side gears 225 and 227 through the pinion gears 223, and then transmitted to the wheels through the axle shaft. If a difference in drive resistance takes place between the wheels when a vehicle drives, for example, on a rough road, the rotations of the pinion gears 223 result in the drive-force of the engine being differential-distributed to the wheels.

Between a top portion 243 of the left side gear 225 and the differential case 203, there is disposed a multiple disc clutch (the frictional clutch) 245. A hydraulic actuator 247 is disposed on the left of the multiple disc clutch 245. Moreover, an oil pump 250 consisting of a plurality of (four sets in this embodiment) internal gear pumps 249 is disposed on the left of the hydraulic actuator 247, as shown in FIG. 9.

As shown in FIG. 8, a back ring 251 is disposed between the multiple disc clutch 245 and the differential case 203 so as to burden the pressing force which acts on the multiple disc clutch 245.

Pistons 253 of the hydraulic actuator 247 are moveable in the axial direction and sealed at a position between a pump case (a pump housing) 255 of the gear pumps 249 and the differential case 203 through seal rings 257 and 259. A cylinder 261 of the hydraulic actuator 247 is formed among the piston 253, the pump case 255 and the differential case 203.

As shown in FIG. 9, each of the gear pumps 249 consists of the pump case 255, an internal gear (a pump drive gear) 263, four external gears (pump gears) 265, check valve mechanisms 267 and 269 and the like.

The inner surface of the pump case 255 is movably, in the axial direction, connected to the outer surface of the boss portion 229 of the left side gear 225, the connection being established in a spline portion 271. The outer surface of the internal gear 263 is, in a spline portion 273, connected to the internal surface of the differential case 203. The pump case 255 includes four pump chambers 275 formed at equal intervals in the circumferential direction so that each external gear 265 is slidably and rotatively accommodated in the pump chamber 275. Moreover, the external gear 265 is engaged to the internal gear 263 so that four sets of gear pumps 249 are formed.

Therefore, when differential rotation takes place with the differential gear mechanism 241, the relative rotations of the differential case 203 (the internal gear 263) and the left side gear 225 (the pump case 255) cause the gears 263 and 265 to be engaged to each other and rotated. Thus, each of the gear pumps 249 is operated.

As shown in FIG. 10, a cover 207 of the differential case 203 has four sets of suction ports 277 at positions opposite to the two side portions (the suction side and discharge side of the gear pumps 249) of the engagement portions of the gears 263 and 265. Moreover, the cover 207 has valve seats 279 allowed to communicate with each of the suction ports 277. As shown in FIG. 9, the pump case 255 has four sets of discharge ports 281 at positions opposite to the suction portion and discharge portion of the gear pumps 249. Moreover, the pump case 255 has a valve seat 283 allowed to communicate with each of the discharge ports 281, as shown in FIG. 8.

As shown in FIG. 8, each of the check valve mechanisms 267 consists of a valve seat 279 and a disc-shape check valve 285 disposed in the suction portion, the check valve 285 being capable of closing the valve seats 279. Separation of the check valve 285 is prevented by the side surface of each of the gears 263 and 265. The valve seat 279 faces the gear pump 249. Thus, each check valve mechanism 267 causes the check valve 285 to open or close the valve seat 279 to allow oil to flow through the suction port 277 to the gear pumps 249. Moreover, the check valve mechanism 267 interrupts oil which returns from the gear pump 249 to the suction port 277.

Each of the check valve mechanisms 269 consist of a valve seat 283 and a disc-shape check valve 287 disposed in the discharge portion, the check valve 287 being capable of closing the valve seat 283. Separation of each check valve 287 is prevented by a plate ring 289 attached to the pump case 255. The valve seat 283 faces the hydraulic actuator 247 so that each of the check valve mechanisms 269 causes oil to flow from the gear pump 249 to the discharge port 281 (adjacent to the hydraulic actuator 247) and interrupts oil returned from the discharge port 281.

When the gear pumps 249 are rotated, the check valve mechanism 267 is opened in the suction portion of each of the gear pumps 249 regardless of the direction of rotation so that oil is sucked by the gear pumps 249. Moreover, the check valve mechanisms 269 are closed so that oil returned from the hydraulic actuator 247 is interrupted. In the discharge portion of each gear pump 249, the check valve mechanism 267 is closed so that oil returned from the gear pump 249 to outside of the differential case 203 is interrupted and the check valve mechanism 269 is opened, causing oil to be supplied to the hydraulic actuator 247.

As described above, when each of the gear pumps 249 is rotated, oil pressure is always applied to the cylinder 261 of the hydraulic actuator 247 regardless of the direction of rotation (the direction of differential rotation of the differential gear mechanism 241, that is, the direction in which the vehicle is driven).

An oil pocket 289 is attached to the side surface of the cover 207. The oil pocket 289 comprises a partition member 291, a sealing member 293 serving as an inward lining for the partition member 291 to prevent liquid leakage, and a ring 295. Thus, the oil pocket 289 forms an oil chamber 297 together with the cover 207.

The oil pocket 289 is slidable and rotatable with respect to the cover 207. An oil pipe (An oil passage)is connected to the oil pocket 289. The oil pipe establishes communication between the oil reservoir of the differential carrier and the oil pocket 289 through an oil strainer and a control valve.

When each of the gear pumps 249 is operated, oil is sucked from the oil reservoir through the oil pipe so that the oil chamber 297 is filled with oil. As a result, the pressure of oil is applied to the cylinder 261.

When the pressure of oil is applied to the cylinder 261, the hydraulic actuator 247 presses and clutches the multiple disc clutch 245 through the piston 253. As a result, the frictional resistance of the multiple disc clutch 245 and the pumping work of each gear pump 249 limit the differential of the differential gear mechanism 241. Since the frictional resistance of the multiple disc clutch 245 and the pumping work of the gear pumps 249 are strengthened as the differential rotational frequency is raised, a differential limiting function sensitive to the differential rotational frequency can be realized.

If the differential rotational frequency is made to be lower than a predetermined level, the check valve mechanisms 267 and 269 close each oil port so that the pumping functions of the gear pumps 249 are interrupted and, therefore, the differential limiting operation is suspended.

The piston 253 has orifices 299 so that when the oil pressure is applied to the cylinder 261, the piston 253 discharges air mixed with oil and appropriately discharges oil. Discharged oil lubricates the multiple disc clutch 245, the engagement portion of each gear and sliding portion between the pinion gears 223 and the pinion shafts 217 and that between the pinion gears 223 and the spherical washer 233. Then, oil is discharged through openings 301 and 303 formed in the differential case 203 due to centrifugal force and then returned to the oil reservoir in the differential carrier.

During the period in which the differential gear mechanism 241 transmits the torque, the reaction from the engagement with the pinion gears 223 acts on each of the side gears 225 and 227. The left side gear 225 is moved to the left due to the reaction from the engagement. Since the right side gear 227 cannot be moved to the right because it is in contact with the differential case 203 through the washer 239, the side gear 225 receives the reaction from the engagement and that from the side gear 227.

However, the great reaction from the engagement (that is, the thrust force) acting on the side gear 225 does not act on the pump case 255 but instead acts on a side wall 305 of the differential case 203 in a manner different from the conventional structure. This is because the pump case 255 of the gear pumps 249 is spline-connected to the boss portion 229 of the side gear 225 while being allowed to move in the axial direction.

The differential unit 201 is formed as described above.

A vehicle, on which the differential unit 201 is mounted, has an excellent differential limiting function of the speed sensitive type so that idle rotations of the drive wheels are prevented and, thus, the rough-road running capability is improved. As described above, the differential unit 201 has four sets of the gear pumps 249 similar to the first and second embodiments so that a satisfactory differential limiting force is obtained even if the differential rotational frequency is low. Thus, the driveability of the vehicle can be improved significantly.

Since the internal gear pumps 249 are employed, the diameter of the internal gear 263 can be enlarged without limitation of external gears which takes place in a case where an external gear pump is used. Therefore, the P.C.D (pitch circle diameter of circle on which the oil ports are formed) of the oil ports 277 and 287 can be enlarged. As a result, even if the oil ports 277 and 281 for the four sets of the gear pumps 249 are formed in the differential case 203 (in the differential unit 201), ports are disposed apart from each other. Thus, the deterioration in the strength of the differential case 203 can be prevented satisfactorily.

Since the rotational frequency of the external gears 265 per rotational frequency of the internal gear 263 is raised due to the enlargement of the diameter of the internal gear 263, the oil discharge from each of the gear pumps 249 can be enlarged, thus causing the pumping pressure to be raised. Therefore, dependency of the differential limiting function upon the pumping pressure is moderated in addition to the effect obtainable from the dispositions of the plural gear pumps 249. Therefore, the influence from change in the differential rotational frequency can be prevented and the differential limiting function can be stabilized.

Since the P.C.D of the oil ports 277 and 281 is enlarged, the oil level in the oil reservoir can be lowered. Although oil in the oil reservoir is stirred and, therefore, allowed to adhere to the inner wall of the differential carrier during the rotations of the differential unit 201, lowering of the oil level results in the thickness of oil allowed to adhere to the inner wall being thinned. Therefore, the quantity of oil required to be injected into the differential carrier can be reduced. Moreover, the rotational resistance and power loss taking place with the differential unit 201 can be reduced so that the fuel consumption of the engine is reduced significantly.

Since the boss portion 229 of the side gear 225 is connected while being permitted to be moved relatively in the axial direction to the pump case 255, the differential case 203 is able to receive the thrust forces of the side gears 225 and 227. Thus, deflection of the pump case 255 taking place due to the thrust forces of the side gears 225 and 227 and scoring taking place between the pump case 255 and the gears 263 and 265 can be prevented. Moreover, the necessity of thickening the pump case 255 can be eliminated. As a result, the weight and size of the differential unit 201 can be reduced.

The drive gear mechanism is not limited to the bevel-gear-type mechanism. For example, a helical-type drive gear mechanism may be employed which uses the frictional resistance among drive gears and that among the gears and the differential case to obtain a sensitive differential limiting function.

Use of a drive gear mechanism of the foregoing type enables a differential unit to be obtained which has a speed-sensitive-type differential limiting function as well as the torque-sensitive-type differential limiting function.

A fourth embodiment of the present invention will now be described with reference to the drawings.

Figure 11:
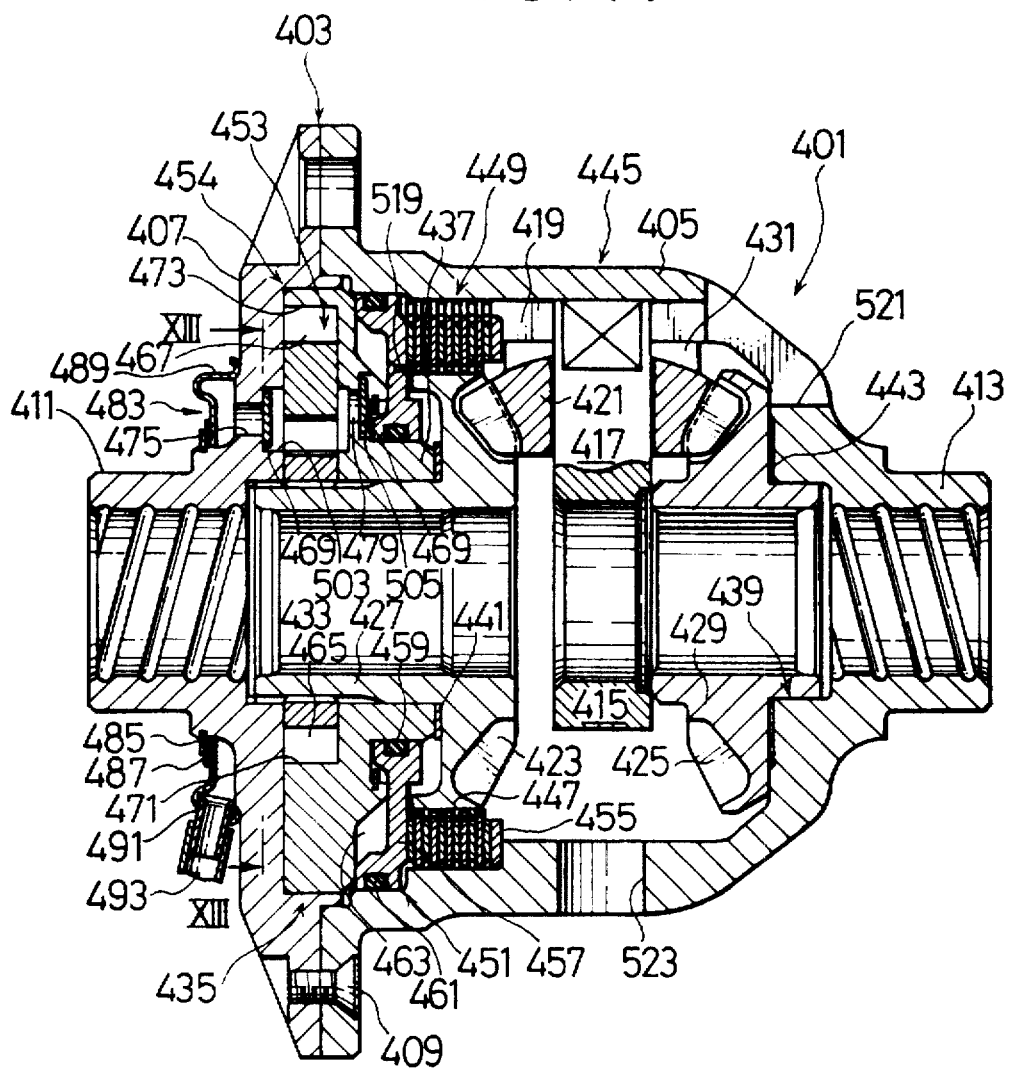
FIG. 11 is a cross sectional view showing a differential unit according to a fourth embodiment of the present invention.
Figure 12:
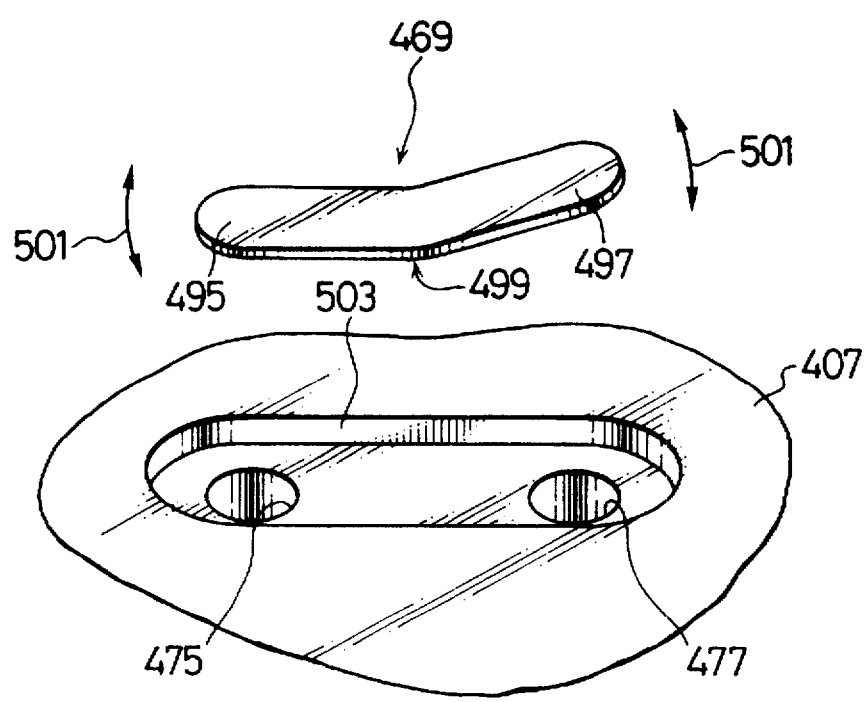
FIG. 12 is a perspective view showing the structure of a valve plate portion according to the fourth embodiment.
Figure 13:
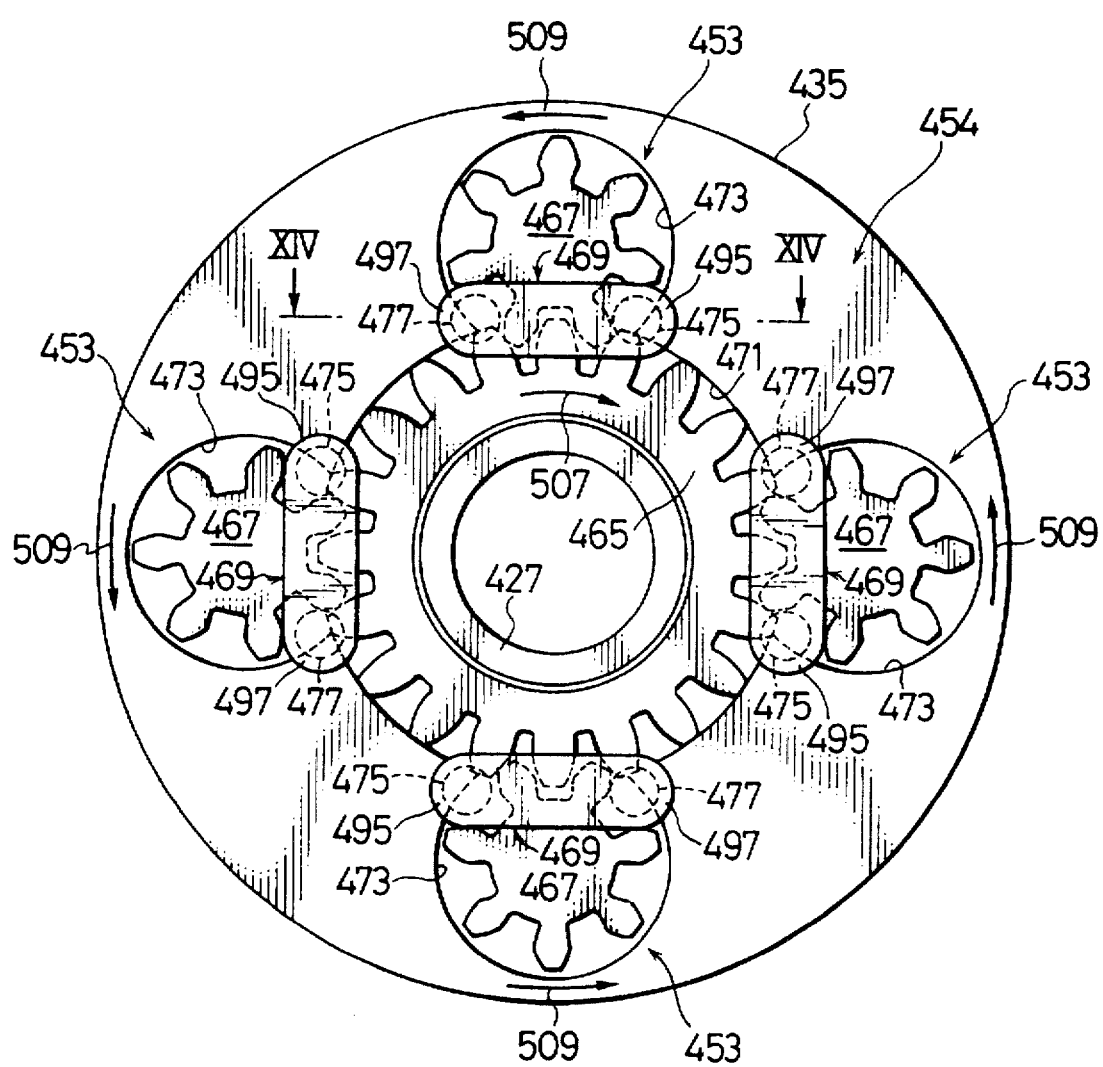
FIG. 13 is a cross sectional view taken along line XIII—XIII shown in FIG. 11.
Figure 14:
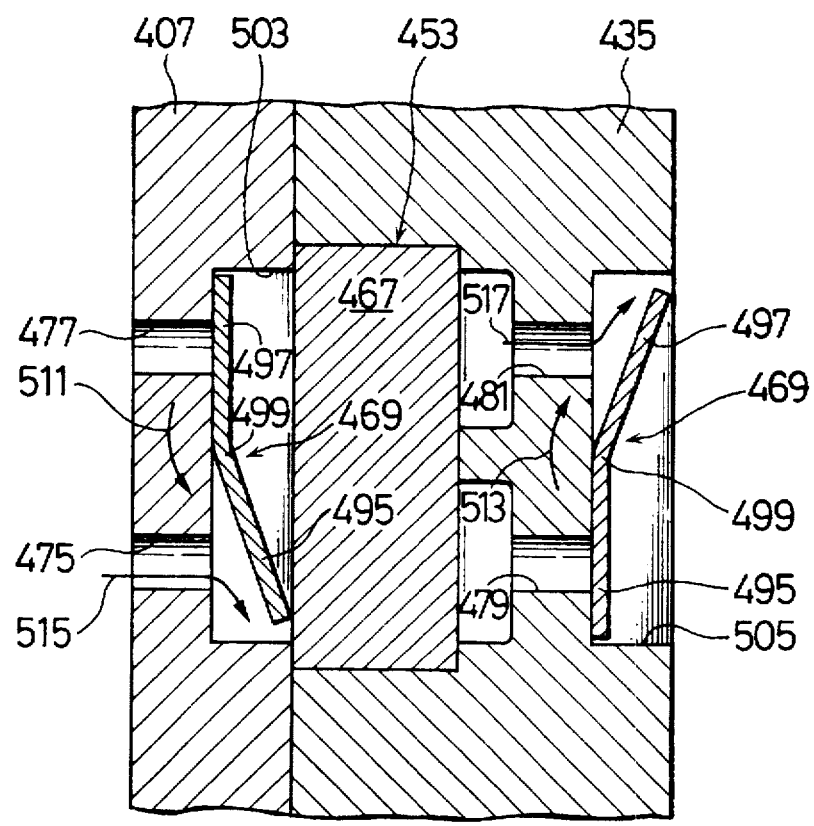
FIG. 14 is a cross sectional view taken along line XIV—XIV shown in FIG. 13.

FIG. 11 is a cross sectional view showing a differential unit according to this embodiment. FIG. 12 is a perspective view showing the structure of a valve plate portion. FIG. 13 is a cross sectional view taken along line XIII—XIII shown in FIG. 11. FIG. 14 is a cross sectional view taken along line XIV—XIV shown in FIG. 13.

As shown in FIG. 11, a differential case 403 of a differential unit 401 is formed by securing a casing 405 and a cover 407 to each other with bolts 409. The differential case 403 is disposed in the differential carrier. The differential carrier has an oil reservoir formed therein.

Right and left boss portions 411 and 413 of the differential case 403 are supported by the differential carrier through bearings. A ring gear is secured to the differential case 403 with bolts, the ring gear being engaged to a drive gear of a drive-force transmission system. Thus, the differential case 403 is rotated by the drive force of the engine through a transmission and the drive-force transmission system.

The differential case 403 includes a plurality of pinion shafts 417 disposed radially relative to a boss portion 415. An outer end of each of the pinion shafts 417 is, in a direction of rotations, received in a groove 419 of the differential case 403. Pinion gears 421 are rotatively supported on each of the pinion shafts 417.

Right and left side gears 423 and 425 are disposed in the differential case 403. The side gears 423 and 425 are integrally formed with corresponding boss portions 427 and 429 so that the side gears 423 and 425 are supported from outside in the radial direction due to engagement with the pinion gears 421. Between the pinion gears 421 and the differential case 403, there is disposed a spherical washer 431. The centrifugal force of the pinion gears 421 and the engagements with the side gears 423 and 425 burden the reaction from the engagement which acts on the pinion gears 421.

The boss portion 427 of the left side gear 423 is rotatively supported by a support portion 433 of the differential case 403 and the inner surface of a boss portion 437 of a pump body (a pump housing) 435 to be described later. The boss portion 429 of the right side gear 425 is rotatively supported by a support portion 439 of the differential case 403. Between the left side gear 423 and the pump body 435, there is disposed a washer 441. Between the right side gear 425 and the differential case 403, there is disposed a washer 443. The side gears 423 and 425 are, through the corresponding boss portions 427 and 429, spline-connected to the axle shaft (the output shaft) and positioned by means of stopper rings.

Thus, a bevel-gear-type differential mechanism 445 is formed. The pinion shafts 417, the pinion gears 421 and the side gears 423 and 425 of the differential mechanism 445 can be moved appropriately in the axial direction between the pinion shafts 417 and the groove 419.

The drive force of the engine for rotating the differential case 403 is distributed from the pinion shaft 417 to the side gears 423 and 425 through the pinion gears 421, followed by being transmitted to the wheels through the axle shaft. If a difference in the drive resistance arises between the wheels during driving on, for example, a rough road, the rotations of each of the pinion gears 421 cause the drive force of the engine to be differential-distributed to the right and the left portions.

Between a top portion 247 of the left side gear 423 and the differential case 403, there is disposed a multiple disc clutch (a frictional clutch) 449. A hydraulic actuator 451 is disposed on the left of the multiple disc clutch 449. Moreover, an oil pump 454 consisting of four sets of external gear pumps 453 is disposed on the left of the hydraulic actuator 451.

Between the multiple disc clutch 449 and the differential case 403, there is disposed a back ring 455 to burden the pressing force of the multiple disc clutch 449.

A piston 457 of the hydraulic actuator 451 is moveable in the axial direction between the outer surface of the boss portion 437 of the pump body 435 and the internal surface of the differential case 403 and sealed through seals 459 and 461. A cylinder 463 of the hydraulic actuator 451 is formed among the piston 457, the pump cover 435 and the differential case 403.

Each of the gear pumps 453 is formed by the pump body 435, a large-diameter gear (a pump drive gear) 465, four small-diameter gears (pump gears) 467, and valve plates (valve members) 469 shown in FIG. 12.

The pump body 435 is inserted into the differential case 403 and then secured to the differential case 403 with bolts. As shown in FIG. 13, the pump body 435 has a first accommodation opening 471 having a large diameter and four second accommodation openings 473 each having a small diameter. The second accommodation openings 473 are, at the same intervals in the circumferential direction, formed on the outside of the first accommodation opening 471. The first accommodation opening 471 and the second accommodation openings 473 are allowed to communicate with one another so that a pump chamber is formed. The large-diameter gear 465 and the small-diameter gear 467 respectively are slidably and rotatively accommodated in the accommodation openings 471 and 473 so as to be engaged to each other so that four sets of gear pumps 453 are formed.

The inner surface of the large-diameter gear 465 is spline-connected to the outer surface of the boss portion 427 of the left side gear 423. Therefore, when differential rotations take place with the differential mechanism 445, the pinion gears 467 adjacent to the pump body 435 secured to the differential case 403 and the large-diameter gear 465 adjacent to the left side gear 423 are relatively rotated so that each of the gear pumps 453 is rotated.

As shown in FIG. 14, the cover 407 of the differential case 403 has an oil port 475 corresponding to either of the rotational directions of the small-diameter gear 467 and an oil port 477 corresponding to another rotational direction. The pump body 435 has an oil port 479 corresponding to either of the rotational directions of each of the small-diameter gears 467 and an oil port 481 corresponding to another rotational direction.

As shown in FIG. 10, the side wall of the cover 407 has an oil pocket 483 attached thereto with a stop ring 485 and a washer 487. The oil pocket 483 is secured to the portion adjacent to the differential carrier, the oil pocket 483 pressing the side wall of the cover 407 to prevent liquid leakage. Thus, an oil reservoir 489 is formed between the oil pocket 483 and the cover 407. An oil pipe (An oil passage ) 493 is connected to the oil pocket 483 by a joint 491.

The oil pipe 493 is allowed to communicate with the oil reservoir of the differential carrier through an oil strainer and a control valve. An air pipe for mixing air with oil is connected to the foregoing control valve through a flow adjustment valve. The control valve and the flow control valve are controlled by a controller.

The oil reservoir 489 is supplied with oil or a mixture of oil and air from the oil reservoir or the air pipe of the differential carrier due to suction pressure of the gear pumps 453 so that the oil ports 475 and 477 of the cover 407 are soaked with oil.

As shown in FIGS. 12 and 14, the valve plate 469 is made of a plate bent into a V-shape. The valve plate 469 has a pair of valve portions 495 and 497 and a swing support point 499 formed between the two valve portions 495 and 497. As indicated by an arrow 501 shown in FIG. 12, the valve plate 469 is able to swing relative to the swing support point 499.

As shown in FIG. 14, the valve plate 469 adjacent to the oil reservoir 489 is disposed in a groove 503 of the cover 407 so that valve portions 495 and 497 are made to be opposite to the corresponding oil ports 475 and 477. The valve plates 469 adjacent to the hydraulic actuator 451 is disposed in a groove 505 of the pump body 435 so that valve portions 495 and 497 are made to be opposite to the corresponding oil ports 479 and 481. Each of the valve plates 469 receives the oil pressure from the gear pump 453 so that the valve plates 469 are positioned in the respective grooves 503 and 505.

When differential rotations take place with the gear mechanism 445 causing each gear pump 453 to be operated and, therefore, the large-diameter gear 469 is rotated in a direction indicated by an arrow 507 as shown in FIG. 13 and then the small-diameter pinion gears 467 are rotated in a direction indicated by an arrow 509, the oil ports 475 and 479 are made to be the suction ports and the oil ports 477 and 481 are made to be the discharge ports.

At this time, the valve plate 469 adjacent to the oil reservoir 489 receives the discharge pressure and suction pressure of the respective gear pumps 453 and swings in a direction indicated by an arrow 511, as shown in FIG. 14.

Thus, the valve portion 497 overlaps the discharge oil port 477 to close the oil port 477. On the other hand, overlapping of the suction oil port 475 with the valve portion 495 ends and port 475 is opened. The valve plate 469 adjacent to the hydraulic actuator 451 swings in a direction indicated by an arrow 513 so that the valve portion 495 overlaps the suction oil port 479 to close the oil port 479. Moreover, overlapping of the discharge oil port 481 with the valve portion 497 ends and the port is opened.

Therefore, oil is, through the suction oil port 475, sucked from the oil reservoir 489 as indicated by an arrow 515 so as to be supplied to the hydraulic actuator 451 through the discharge oil port 481 as indicated by an arrow 517. Moreover, the oil ports 479 and 477 are closed so that pressure leakage from the hydraulic actuator 451 to the oil reservoir 489 is prevented.

When the direction of the differential rotations of the differential mechanism 445 is reversed and the large-diameter gear 469 and the small-diameter gears 467 are respectively rotated in the direction opposite to the direction indicated by the arrows 507 and 509, the oil ports 477 and 481 are changed to the suction ports and the oil ports 475 and 479 are changed to the discharge ports.

Therefore, each of the valve plates 469 receives the discharge pressure and the suction pressure of each of the gear pumps 453 and then swings in a direction opposite to that shown in FIG. 14. As a result of the foregoing swinging operation, the discharge oil port 475 in the oil reservoir 489 is closed so that the discharge oil port 477 is opened. On the other hand, the suction oil port 481 adjacent to the hydraulic actuator 451 is closed so that the discharge oil port 479 is opened.

Thus, oil is sucked from the oil reservoir 489 through the discharge oil port 477 so that oil is supplied to the hydraulic actuator 451 through the discharge oil port 479. Moreover, the oil ports 475 and 481 are closed so that pressure leakage from the hydraulic actuator 451 to the oil reservoir 489 is prevented.

Regardless of the rotational direction of the gear pump 453 (regardless of the direction of the differential rotations), the checking function of each valve plate 469 causes the oil flow to be rectified into one direction. As a result, oil sucked from the oil reservoir 489 can be supplied to the hydraulic actuator 451, if necessary.

Since each valve plate 469 swings due to a force couple generating when the oil pressure of the gear pump 453 is applied to the valve portions 495 and 497, a large force for closing the oil port is obtained as compared with a structure in which the valve plate is closed by only the oil pressure of the oil pump to be applied thereto. Therefore, a complete checking function is obtained. Thus, if the differential rotational frequency is low and, therefore, the discharge pressure from the gear pump 453 is low, pressure leakage and loss of the pumping work can still be prevented. As a result, satisfactory large differential limiting force can be obtained.

Note that orifices 519 are provided for the piston 457 so as to appropriately discharge oil together with air mixed with oil during oil pressure being applied to the cylinder 463. Discharged oil lubricates the multiple disc clutch 449, the engagement portions among the gears, and the sliding portion between the pinion gears 421 and the pinion shaft 417 and that between the pinion gears 421 and the spherical washer 431. Then, oil is discharged through openings 521 and 523 formed in the differential case 403 to the outside due to centrifugal force followed by being returned to the oil reservoir of the differential carrier.

The controller for controlling the control valve and the flow adjustment valve disposed in the oil passage which reaches the oil reservoir 489 as described above is supplied with signals from a car-speed sensor, a brake sensor, a steering-angle sensor and the like.

In response to the foregoing signals, the controller controls the control valve. Thus, when the running speed of the vehicle is, for example, 40 km/h or lower, the controller interrupts air but allows oil to flow. If the speed is higher than 40 km/h or the brake pedal is operated or the steering angle is larger than a predetermined angle, the controller causes air to be mixed with oil. Moreover, the controller adjusts the air flow adjustment valve to adjust the quantity of air to be mixed with oil.

When air is interrupted, only oil is supplied to each gear pump 453. Thus, if the differential rotational frequency is raised, the differential limiting force is rapidly enlarged. Since the discharge pressure from each gear pump 453 is lowered when air is mixed with oil, the clutching force of the multiple disc clutch 449 is lowered and, therefore, enlargement of the differential limiting force can be prevented to a low level. By adjusting the flow adjustment valve while mixing air with oil, a variety of differential limiting characteristics can be realized.

The differential unit 401 is constituted as described above.

Since the differential unit 401 is, as described above, able to check the oil ports 475 and 477 of the oil reservoir 489 and the oil ports 479 and 481 adjacent to the hydraulic actuator 451 by using only one valve plate 469 respectively, the number of required check valves (the valve plates 469) can be halved as compared with the conventional structure with which a check valve must be provided for each oil port. Therefore, the number of required parts can be decreased, and the number of mounting processes can be reduced and thus the cost can be reduced.

Since the position of each valve plate 469 is maintained by the oil pressure, the bolts for securing the check valve can be omitted. Thus, the structure can be simplified and the number of required parts, the number of mounting processes and the cost can be reduced.

Since the pressure leakage from the closed oil ports can be prevented, the differential unit 401 realizes a differential limiting function exhibiting quick response with respect to a change in differential rotation. Thus, large differential limiting force corresponding to the performance of each gear 453 can be obtained and, therefore, the differential limiting function can be stabilized.

Therefore, a vehicle having the differential unit 401 is enabled to have a stable speed-sensitive differential limiting function with which idle rotations of the drive wheels taking place due to a rough road or the like can be prevented. Thus, rough-road driving performance can be improved. In a case where the vehicle turns rapidly and, thus, large differential rotational frequencies are generated, the differential limiting function exhibiting rapid response with respect to the differential rotations causes the attitude and the action of the vehicle to be stabilized. In a case of a moderate turn with low differential rotational frequencies, the vehicle is able to smoothly and stably turn.

Although this embodiment has structure such that the valve plates (the valve members) 469 are attached to the oil ports for the same pump gear 453, the valve plates (the valve members) may be disposed across oil ports for different oil pumps in a case where a plurality of oil pumps are provided for the differential unit.

A fifth embodiment of the present invention will now be described with reference to the drawings.

Figure 15:
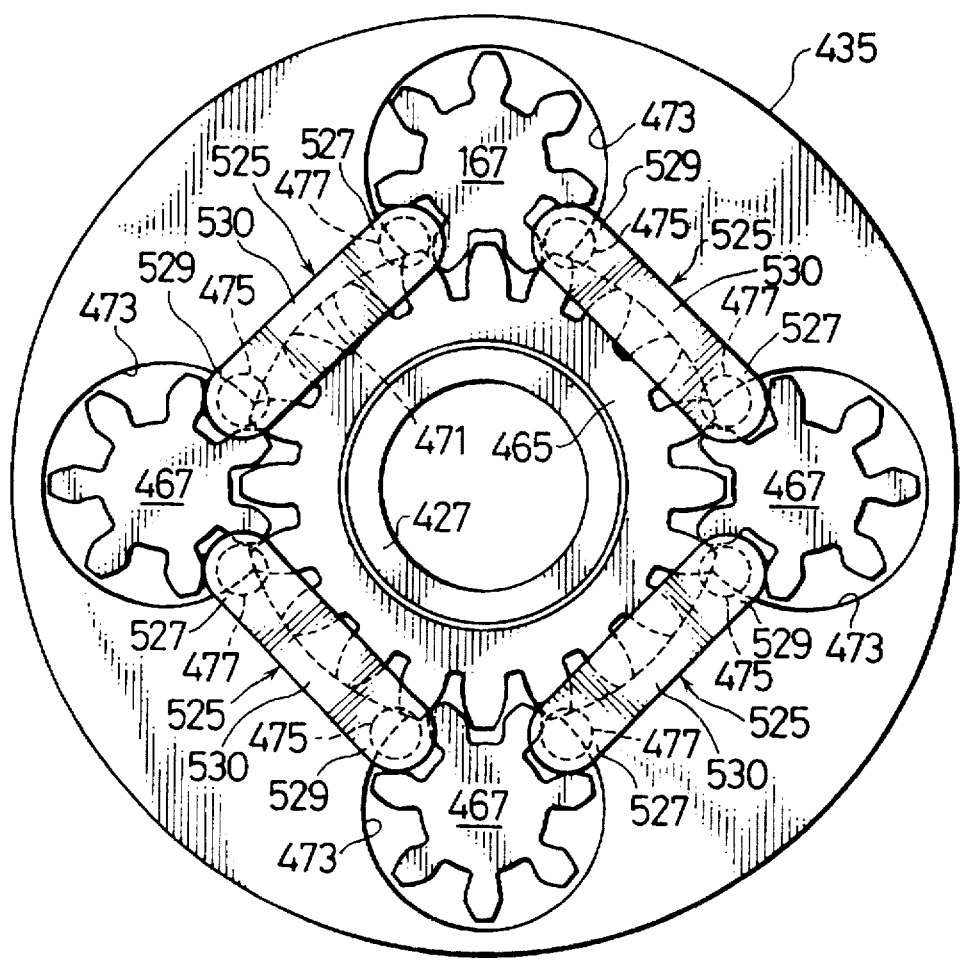
FIG. 15 is a cross sectional view showing a differential unit according to a fifth embodiment of the present invention.

FIG. 15 is a cross sectional view of a differential unit according to this embodiment. As shown in FIG. 15, this embodiment has a structure such that valve plate is disposed across oil ports for different oil pumps. Note that elements having similar functions to those according to the fourth embodiment are given the same reference numerals and they are omitted from illustration.

A groove formed in a cover 407 of a differential case 407 receives a valve plate (a valve member) 525 adjacent to an oil reservoir 489 of each gear pump 453. On the other hand, a groove formed in a pump body 435 receives a valve plate 525 adjacent to the hydraulic actuator 451 of each gear pump 453. The foregoing valve plates 525 are V-shape plates formed by bending and are capable of swinging relative to a swing support point 530 formed between a pair of valve portions 527 and 529. The position of each valve plate 525 is maintained within the groove with the oil pressure of the gear pump 453.

The valve plate 525 adjacent to the oil reservoir 489 has valve portions 527 and 529 which face adjacent oil ports 477 and 475 for the gear pump 453. On the other hand, the valve plate 525 adjacent to the hydraulic actuator 451 has valve portions 527 and 529 which face adjacent oil ports 481 and 479 for adjacent gear pumps 453.

When the differential mechanism 445 differential-rotates, each gear pump 453 is operated and thus the oil ports 475 and 479 are made to be suction ports, the oil ports 477 and 481 are made to be discharge ports, and each valve plate 525 receives the discharge pressure and suction pressure from each gear pump 453 so that each valve plate 525 swings. In the oil reservoir 489, the valve portion 527 overlaps the discharge oil port 477 so that the discharge oil port 477 is closed. On the other hand, overlapping of the suction oil port 475 with the valve portion 529 ends so that the suction oil port 475 is opened. In the portion adjacent to the hydraulic actuator 451, the valve portion 529 overlaps the suction oil port 479 so that the suction oil port 479 is closed. On the other hand, overlapping of the discharge oil port 481 with valve portion 527 ends so that the discharge oil port 481 is opened.

When the direction of the differential rotations of the differential mechanism 445 is reversed causing the oil ports 477 and 481 to be changed to the suction ports and the oil ports 475 and 479 to be changed to the discharge ports, each valve plate 525 receives the discharge pressure and suction pressure of each gear pump 453 so that each valve plate 525 swings. As a result of the foregoing swinging operation, the discharge oil port 475 in the oil reservoir 489 is closed so that the suction oil port 477 is opened. In the portion adjacent to the hydraulic actuator 451, the suction oil port 481 is closed and the discharge oil port 479 is opened.

As described above, the checking function of each valve plate 525 rectifies the oil flow so that oil sucked from the oil reservoir 489 is supplied to the hydraulic actuator 451 if necessary, regardless of the direction of the differential rotations and the direction of rotations of the gear pump 453.

Since each valve plate 525 swings due to a force couple generated when the oil pressure of the gear pump 453 is applied to the two valve portions 527 and 529, the force for closing the oil port is large as compared with the conventional structure in which only the closing force applied to the valve plate which is closed can be obtained. Therefore, a complete checking function can be realized. Thus, even if the differential rotational frequency is low and the discharge pressure from the gear pump 453 is low, pressure leakage and loss of the pumping work can be prevented. As a result, a satisfactorily large differential limiting force can be obtained.

The differential unit according to the fifth embodiment has the foregoing structure.

The differential unit according to this embodiment has the structure such that one valve plate 525 is able to check the oil ports 475 and 477 in the oil reservoir 489. And one valve plate 525 is able to check the oil ports 479 and 481 adjacent to the hydraulic actuator 451. Therefore, the check valves (the valve plates 525) can be halved similar to the fourth embodiment. Thus, the number of required parts can be reduced, the structure can be simplified, and the number of mounting processes and the cost can be reduced.

Since the position of each valve plate 525 is maintained with the oil pressure, the fixing bolts can be omitted similar to the fourth embodiment. The number of required parts and that of the mounting processes can be decreased, and the cost can be reduced.

Since oil leakage from the closed oil ports can be prevented as described above, the differential unit according to this embodiment attains a differential limiting function exhibiting quick response with respect to change in the differential rotations and great differential limiting force. As a result, the differential limiting function can be stabilized. Therefore, a vehicle, on which the differential unit according to this embodiment has been mounted, has improved rough-road driving capability due to the realized speed-sensitive differential limiting function. Moreover, the attitude and the behavior of the vehicle can be stabilized due to the differential limiting function exhibiting quick response. When the vehicle turns moderately, the differential limiting force is reduced appropriately so that the vehicle is able to smoothly and stably turns.

Figure 16:
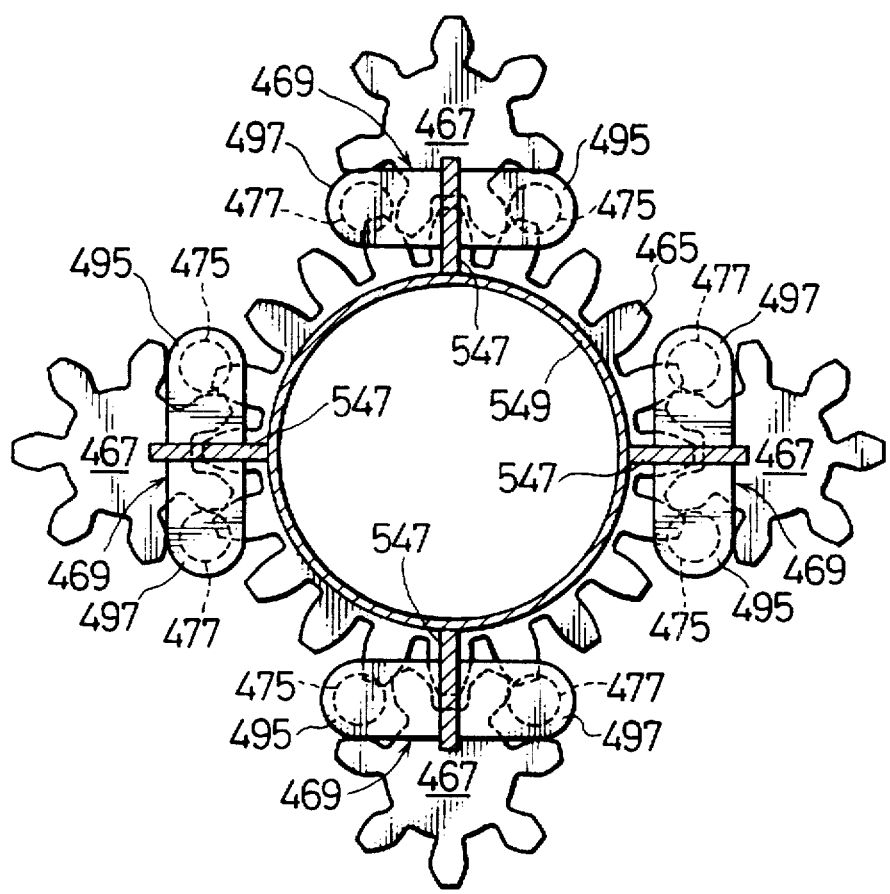
FIG. 16 is a cross sectional view showing a sixth embodiment of the present invention.
Figure 17:
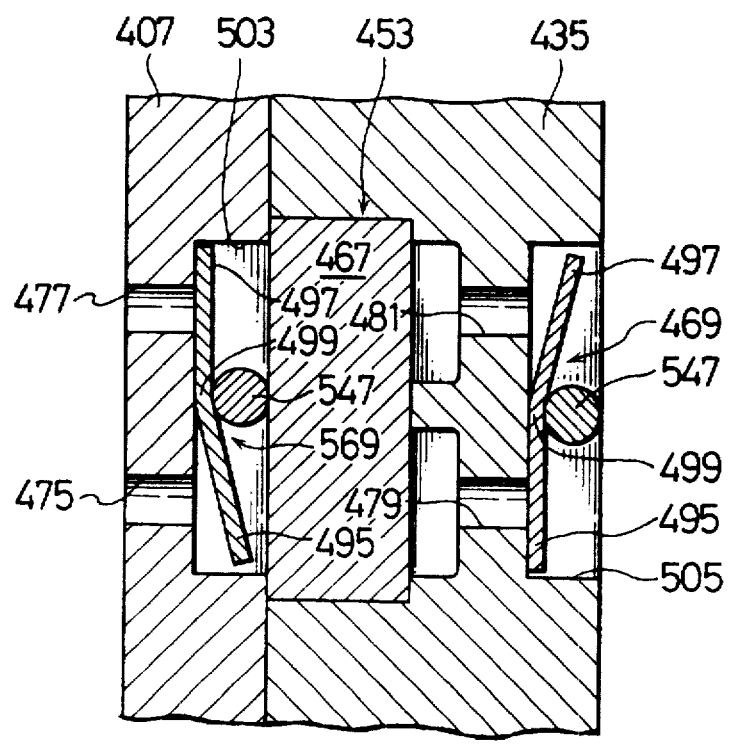
FIG. 17 is a cross sectional view showing the sixth embodiment of the present invention.

A sixth embodiment of the present invention will now be described. FIGS. 16 and 17 are cross sectional views showing the sixth embodiment.

Note that elements having the same functions as those of the elements according to the fourth embodiment are given the same reference numerals.

As shown in FIGS. 16 and 17, a differential unit according to this embodiment has the structure such that a valve plate (valve members) 469 is provided for each of the oil reservoir 489 and the hydraulic actuator 451 of each gear pump 453. The valve plate 469 is a bent plate formed into a V-shape, the valve plate 469 having a pair of valve portions 495 and 497 and is capable of swinging relative to a swing support point 499.

As shown in FIG. 17, the valve plate 469 in the oil reservoir 489 is received in a groove 503 formed in the cover 407 of the differential case 403, the valve plate 469 having valve portions 495 and 497 which face the oil ports 475 and 477. The valve plate 469 adjacent to the hydraulic actuator 451 is received in a groove 505 formed in the pump body 435, the valve plate 469 having valve portions 495 and 497 which face the oil ports 479 and 481.

As shown in FIG. 16, the reverse surface of the swing support point 499 of each valve plate 469 is fixed by a pin (a retaining member) 547 so as to be held in each of the grooves 503 and 505. The four pins 547 are integrally connected to an annular connection portion 549. The integrated pins 547 and the connection portion 549 respectively are press-fit in the grooves formed in the cover 407 and that formed in the pump body 435.

When each gear pump 453 receives differential rotations of the differential mechanism 445 and thus rotates in either direction, each valve plate 469 receives the discharge pressure and suction pressure so that the each valve plate 469 swings. In the oil reservoir 489, the suction portions of the oil ports 475 and 479 are opened. On the other hand, the discharge portions are closed. In the portion adjacent to the hydraulic actuator 451, the discharge portions of the oil ports 477 and 481 are closed and the suction portions of the same are closed.

Regardless of the direction of the differential rotations and that of the rotations of the gear pumps 453, the checking function of each valve plate 469 rectifies the oil flow into one direction. Thus, oil sucked from the oil reservoir 489 can be supplied to the hydraulic actuator 451, if necessary.

Since each valve plate 469 generates a force couple because the two valve portions 495 and 497 receive the oil pressure from the gear pump 453, great force for closing the oil port can be realized as compared with the conventional structure. Thus, a complete checking function can be realized. Therefore, even if the differential rotational frequency is low and the discharge pressure from the gear pump 453 is low, pressure leakage and loss of the pumping work can be prevented. As a result, a sufficient differential limiting force can be realized.

Moreover, since the valve plate 469 is reliably supported by the pin 547, the oil pressure to be applied to the valve pressure to be opened is efficiently transmitted to the valve portion to be closed and, therefore, the closing force can be enlarged. Thus, the checking function of the valve plate 469 can furthermore be improved. Since the four pins 547 are integrally disposed, any increase in the number of required parts can be minimized.

Thus, the differential unit according to this embodiment is constituted.

Since the differential unit according to this embodiment has structure such that each of the function of checking the oil ports 475 and 477 in the oil reservoir 489 and that of checking the oil ports 479 and 481 adjacent to the hydraulic actuator 451 is realized by one valve plate 469, the number of the check valves (the valve plates 469) can be halved similar to the fourth embodiment. Thus, the number of required parts can be decreased, the structure can be simplified, and the number of mounting processes and the cost can be reduced. Since the valve plate 469 is not secured by bolts, the cost of the bolts and that required to perform the bolt setting process can be reduced.

Since the closed oil port is free from pressure leakage, the differential unit according to this embodiment has a differential limiting function exhibiting quick response with respect to change in the differential rotations and large differential limiting force. Thus, the differential limiting function can be stabilized.

A seventh embodiment of the present invention will now be described.

Figure 18:
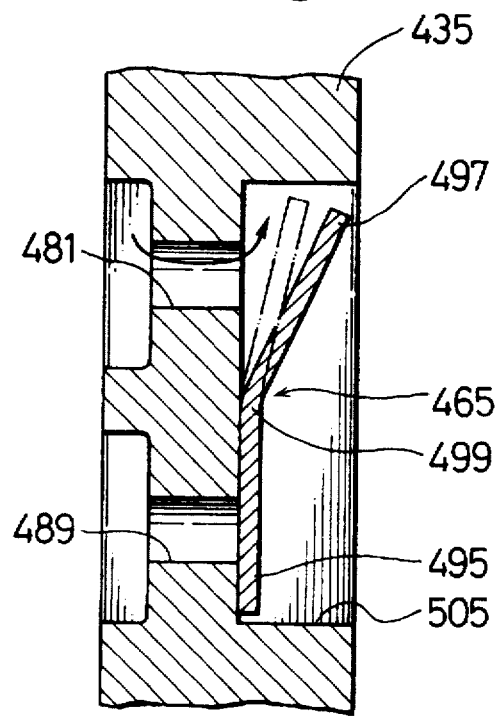
FIG. 18 is a cross sectional view showing a seventh embodiment of the present invention.

FIG. 18 is a cross sectional view showing the seventh embodiment. A valve plate (a valve member) 469 adjacent to the hydraulic actuator 451 according to this embodiment is a temperature-sensitive reversibly-deformable member which is deformed corresponding to the temperature of oil so that it largely opens the oil port when the temperature of oil is low as compared with the case where the temperature of oil is high. Specifically, the valve plate 469 is maintained at a state where it largely opens the oil ports 479 and 481 as indicated by a continuous line shown in FIG. 18 when the temperature of the oil is lower than a predetermined level (the temperature at which the valve is deformed). If the temperature of oil is higher than a predetermined level (the temperature at which the valve is deformed), the valve plate 469 is deformed into a direction as indicated by a dashed line shown in FIG. 18 in which the oil ports 479 and 481 are closed so as to reduce the degree of opening.

As a result, when the temperature of oil is low, the viscosity of oil is high and thus the quantity of leakage of oil from the gear pump 453 is reduced. However, since the degree of opening of each of the oil ports 479 and 481 is large, excessive enlargement of the differential limiting force due to an enlargement of the driving resistance of the gear pump 453 due to the reduction in the quantity of the oil leakage can be prevented. Thus, a required differential limiting operation depending upon the clutching force of the frictional clutch can be performed.

When the temperature of oil is high, the quantity of oil leakage from the gear pump 453 is increased and, therefore, the oil discharge pressure is lowered, thus resulting in the clutching force of the frictional clutch being reduced excessively. However, since the oil ports 479 and 481 are not opened excessively, the driving resistance of the gear pump 453 can be intensified. Thus, the insufficient clutching force of the frictional clutch can be compensated by the driving resistance of the gear pump 453. As a result, a required differential limiting operation can be performed.

Note that the quantity of deformation of the valve plate 469 due to change in the temperature is so set in such a manner that the insufficient clutching force of the frictional clutch realized in the case where the temperature of oil is high can appropriately be compensated by the driving resistance of the gear pump 453.

As a result, with this embodiment, a stable differential limiting operation can be performed without influence from change in the temperature of oil in addition to the effect obtainable from the fourth embodiment.

Although this embodiment has structure such that the valve plate 469 adjacent to the hydraulic actuator 451 is a temperature-sensitive reversibly-deformable member, a valve plate 469 adjacent to the oil reservoir 489 may be a temperature-sensitive reversibly-deformable member. Moreover a valve plate according to the sixth embodiment may be a temperature-sensitive reversibly-deformable member.

Note that the valve member may be provided for either of the oil reservoir portion or the portion adjacent to the hydraulic actuator.

Although the fourth to sixth embodiments have been described about the structure comprising the four sets of (the plural) external-type pump gears 453, an oil pump may be employed which comprises one set or more than one set of internal-type gear pump.

Although each embodiment has the structure such that the oil reservoir is formed in the differential carrier (on the outside of the differential case) and oil is sucked from the oil reservoir through the oil reservoir 489 on the differential case 403, the present invention may have a structure such that oil reservoir is formed in the differential case.

The differential mechanism according to the present invention is not limited to the bevel-gear-type mechanism. For example, a differential mechanism may be employed which uses the frictional resistance of the tooth surfaces of the gears and the frictional resistance between the gear and the differential case to obtain a torque-sensitive-type differential limiting torque function. A differential mechanism of the foregoing type enables a differential unit to be obtained which has the speed-sensitive differential limiting function realized due to the frictional clutch and the oil pump in addition to the torque-sensitive differential limiting function.

The differential limiting clutch is not limited to the multiple disc clutch. For example, another type frictional clutch, for example, a cone clutch may be employed.

The differential unit according to the present invention may be used as either of a front differential mechanism (a differential unit for the axle shaft for the front wheels), a rear differential mechanism (a differential unit for the axle shaft for the rear wheels) or a center differential unit (a differential unit which distributes the drive force of the engine to the front wheels and the rear wheels).

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A differential unit comprising:

a differential case to be rotated by drive force of an engine;

a differential gear mechanism for outputting rotations of said differential case from a pair of side gears thereof through a pinion gear supported in a portion adjacent to said differential case;

a frictional clutch for limiting differential of said differential gear mechanism;

an oil pump to be rotated due to differential rotations of said differential gear mechanism;

an oil passage for causing an oil reservoir in a differential carrier for rotatively supporting said differential case and said oil pump to communicate with each other to allow oil to flow to said oil pump; and a hydraulic actuator which receives oil discharge pressure from said oil pump so as to press and clutch said frictional clutch, wherein said oil pump includes plural sets of gear pumps and a pump housing, said plural sets of gear pumps consists of a pump drive gear and a plurality of pump gears, said pump drive gear is arranged so as to integrally rotate together with one of said differential case and said side gear, said pump housing is arranged so as to integrally rotate together with the other of said differential case and said side gear, said plurality of pump gears are engaged to said pump drive gear and rotatively supported by said pump housing, and said oil pump and said hydraulic actuator are disposed in a space formed between said differential gear mechanism and said differential case.

2. A differential unit according to claim 1, wherein said gear pumps are external gear pumps each having, said pump housing is arranged so as to integrally rotate together with said differential case said pump housing has a first accommodation hole formed coaxially with a rotational axis of said differential case and a plurality of second accommodation holes formed in a circumferential direction of said first accommodation hole at predetermined intervals, said pump drive gear is large-diameter gear rotatively accommodated in said first accommodation hole, disposed on the outer surface of a boss portion of at least one of said side gears and arranged to be rotated together with said side gear, and said pump gears are small-diameter gears rotatively accommodated in said second accommodation holes and arranged to be engaged to said large-diameter gear.

3. A differential unit comprising:

a differential case to be rotated by drive force of an engine;

a differential gear mechanism for outputting rotations of said differential case from a pair of side gears thereof through a pinion gear supported in a portion adjacent to said differential case;

a frictional clutch for limiting differential of said differential gear mechanism;

an oil pump to be rotated due to differential rotations of said differential gear mechanism;

an oil passage for causing an oil reservoir in a differential carrier for rotatively supporting said differential case and said oil pump to communicate with each other to allow oil to flow to said oil pump; and a hydraulic actuator which receives oil discharge pressure from said oil pump so as to press and clutch said frictional clutch, wherein said oil pump includes plural sets of internal gear pumps and a pump housing, said plural sets of internal gear pumps consist of an internal-toothed gear and a plurality of external-toothed gears, said internal-toothed gear is disposed adjacent to said differential case and arranged to be rotated integrally with said differential case, said plurality of external-toothed gears are provided adjacent to said side gear, engaged to said pump drive gear, and rotatively supported by said pump housing, said pump housing are connected to the outer surface of a boss portion of said side gear so as to integrally rotate together therewith and permitted to be moved relatively in a axial direction of said side gear.

4. A differential unit according to claim 3, wherein said oil pump and said hydraulic actuator are disposed in a space formed between a back surface of one of said side gears and said differential case, and the other of said side gears is outwardly shifted from the inner end surface of said boss portion in the axial direction.

5. A differential unit according to claim 3, wherein said hydraulic actuator is disposed between a back surface of one of said side gears and said differential case, said frictional clutch is disposed between an outer surface of said one of said side gears and said differential case.

6. A differential unit according to claim 3, further comprising a pressing member, wherein said hydraulic actuator is disposed between one of said side gears and said differential case, said frictional clutch is disposed between the other of said side gears being opposite to said hydraulic actuator and said differential case, said pressing member is disposed between said hydraulic actuator and said frictional clutch, and said pressing member is supported by said differential case movably in the axial direction and arranged to clutch said frictional clutch when said hydraulic actuator is operated.

7. A differential unit according to claim 3, wherein an inner wall of said differential case forms a portion of said hydraulic actuator.

8. A differential unit according to claim 3, further comprising:

a plurality of oil ports in an oil reservoir, said plurality of oil ports being formed in a portion of said oil pump adjacent to said oil passage and arranged to alternately serve as oil suction openings and oil discharge openings to correspond to change in the direction of rotations of said oil pump;

a plurality of oil ports adjacent to said hydraulic actuator, said plurality of oil ports being formed in a portion of said oil pump adjacent to said hydraulic actuator and arranged to alternately serve as oil suction openings and oil discharge openings to correspond to change in the direction of rotations of said oil pump; and a bent-type valve member disposed adjacent to at least one of said oil reservoir and said hydraulic actuator, and having a pair of valve portions disposed to face said oil ports, said bent-type valve member being able to swing relative to a swing support point disposed between said pair of valve portions, wherein said valve member swings due to a force couple generating when said two valve portions of said valve member receive hydraulic pressure of said oil pump so as to open said oil port for allowing oil to flow from said oil reservoir toward said hydraulic actuator and to close said oil port for allowing oil to flow from said hydraulic actuator toward said oil reservoir.

9. A differential unit according to claim 8, wherein the position of said valve member is maintained due to the oil pressure.

10. A differential unit according to claim 8, wherein said swing support point has, on the reverse side thereof, a retaining member for retaining said valve member onto a fixed member.

11. A differential unit according to claim 8, wherein said valve member is a temperature-sensitive reversibly-deformable member which is deformed corresponding to the temperature of oil and which largely opens said oil port in a low oil temperature state where the temperature of oil is low as compared with a high oil temperature state where the temperature of oil is high.

12. A differential unit comprising:

a differential case to be rotated by drive force of an engine;

a differential gear mechanism for outputting rotations of said differential case from a pair of side gears thereof through a pinion gear supported in a portion adjacent to said differential case;

a frictional clutch for limiting differential of said differential gear mechanism;

an oil pump to be rotated due to differential rotations of said differential gear mechanism;

an oil passage for causing an oil reservoir in a differential carrier for rotatively supporting said differential case and said oil pump to communicate with each other to allow oil to flow to said oil pump; and a hydraulic actuator which receives oil discharge pressure from said oil pump so as to press and clutch a frictional clutch, wherein said oil pump includes plural sets of external gear pumps and a pump housing, said plural sets of external gear pumps consist of a large-diameter gear and plurality of small-diameter gears, said pump housing is arranged so as to integrally rotate together with said differential case, said pump housing has a first accommodation hole formed coaxially with a rotational axis of said differential case and a plurality of second accommodation holes formed in a circumferential direction of said first accommodation hole at predetermined intervals, said large-diameter gear is rotatively accommodated in said first accommodation hole, disposed on the outer surface of a boss portion of at least one of said side gears and arranged to be rotated together with said side gear, said small-diameter gears are rotatively accommodated in said second accommodation holes and arranged to be engaged to said large-diameter gear, said oil pump and said hydraulic actuator are disposed in a space formed between a back surface of one of said side gears and said differential case, and the other of said side gears is outwardly shifted from the inner end surface of said boss portion in the axial direction.

13. A differential unit comprising:

a differential case to be rotated by drive force of an engine;

a differential gear mechanism for outputting rotations of said differential case from a pair of side gears thereof through a pinion gear supported in a portion adjacent to said differential case;

a frictional clutch for limiting differential of said differential gear mechanism;

an oil pump to be rotated due to differential rotations of said differential gear mechanism;

an oil passage for causing an oil reservoir in a differential carrier for rotatively supporting said differential case and said oil pump to communicate with each other to allow oil to flow to said oil pump;

a hydraulic actuator which receives oil discharge pressure from said oil pump so as to press and clutch said frictional clutch; and a pressing member disposed between said hydraulic actuator and said frictional clutch wherein said oil pump includes plural sets of external gear pumps and a pump housing, said plural sets of external gear pumps consist of a large-diameter gear and plurality of small-diameter gears, said pump housing is arranged so as to integrally rotate together with said differential case, said pump housing has a first accommodation hole formed coaxially with a rotational axis of said differential case and a plurality of second accommodation holes formed in a circumferential direction of said first accommodation hole at predetermined intervals, said large-diameter gear is rotatively accommodated in said first accommodation hole, disposed on the outer surface of a boss portion of at least one of said side gears and arranged to be rotated together with said side gear, said small-diameter gears are rotatively accommodated in said second accommodation holes and arranged to be engaged to said large-diameter gear, said hydraulic actuator is disposed between one of said side gears and said differential case, said frictional clutch is disposed between the other of said side gears being opposite to said hydraulic actuator and said differential case, and said pressing member is supported by said differential case movably in the axial direction and arranged to clutch said frictional clutch when said hydraulic actuator is operated.

14. A differential unit comprising:

a differential case to be rotated by drive force of an engine;

a differential gear mechanism for outputting rotations of said differential case from a pair of side gears thereof through a pinion gear supported in a portion adjacent to said differential case;

a frictional clutch for limiting differential of said differential gear mechanism;

an oil pump to be rotated due to differential rotations of said differential gear mechanism;

an oil passage for causing an oil reservoir in a differential carrier for rotatively supporting said differential case and said oil pump to communicate with each other to allow oil to flow to said oil pump;

a hydraulic actuator which receives oil discharge pressure from said oil pump so as to press and clutch a frictional clutch;

a plurality of oil ports in an oil reservoir;

a plurality of oil ports adjacent to said hydraulic actuator; and a bent-type valve member, wherein said oil pump includes plural sets of external gear pumps and a pump housing, said plural sets of external gear pumps consist of a large-diameter gear and plurality of small-diameter gears, said pump housing is arranged to as to integrally rotate together with said differential case, said pump housing has a first accommodation hole formed coaxially with a rotational axis of said differential case and a plurality of second accommodation holes formed in a circumferential direction of said first accommodation hole at predetermined intervals, said large-diameter gear is rotatively accommodated in said first accommodation hole, disposed on the outer surface of a boss portion of at least one of said side gears and arranged to be rotated together with said side gear, said small-diameter gears are rotatively accommodated in said second accommodation holes and arranged to be engaged to said large-diameter gear, said plurality of oil ports in an oil reservoir are formed in a portion of said oil pump adjacent to said oil passage and arranged to alternately serve as oil suction openings and oil discharge openings to correspond to change in the direction of rotations of said oil pump, said plurality of oil ports adjacent to said hydraulic actuator are formed in a portion of said oil pump adjacent to said hydraulic actuator and arranged to alternately serve as oil suction openings and oil discharge openings to correspond to change in the direction of rotations of said oil pump, said bent-type valve member is disposed adjacent to at least one of said oil reservoir and said hydraulic actuator, and has a pair of valve portions disposed to face said oil ports, said bent-type valve member is able to swing relative to a swing support point disposed between said pair of valve portions, said bent-type valve member swings due to a force couple generating when said two valve portions of said valve member receive hydraulic pressure of said oil pump so as to open said oil port for allowing oil to flow from said oil reservoir toward said hydraulic actuator and to close said oil port for allowing oil to flow from said hydraulic actuator toward said oil reservoir.

15. A differential unit according to claim 14, wherein the position of said valve member is maintained due to the oil pressure.

16. A differential unit according to claims 14, wherein said swing support point has, on the reverse side thereof, a retaining member for retaining said valve member onto a fixed member.

17. A differential unit according to claim 14, wherein said valve member is a temperature-sensitive reversibly-deformable member which is deformed corresponding to the temperature of oil and which largely opens said oil port in a low oil temperature state where the temperature of oil is low as compared with a high oil temperature state where the temperature of oil is high.

18. A differential unit according to claim 2, wherein said space in which said oil pump and said hydraulic actuator are disposed is formed between a back surface of one of said side gears and said differential case, and the other of said side gears is outwardly shifted from the inner end surface of said boss portion in the axial direction.

19. A differential unit according to claim 2, wherein an inner wall of said differential case forms a portion of said hydraulic actuator.

20. A differential unit according to claim 1, wherein said oil pump and said hydraulic actuator are disposed in a space formed between a back surface of one of said side gears and said differential case.

* * * * *